United States Patent [19]
Berglund et al.

[11] Patent Number: 5,935,252
[45] Date of Patent: Aug. 10, 1999

[54] APPARATUS AND METHOD FOR DETERMINING AND SETTING SYSTEM DEVICE CONFIGURATION RELATING TO POWER AND COOLING USING VPD CIRCUITS ASSOCIATED WITH SYSTEM DEVICES

[75] Inventors: Neil Clair Berglund, Kasson; Todd Jon Rosedahl, Zumbrota, both of Minn.

[73] Assignee: International Business Machines Corporation, Armonk, N.Y.

[21] Appl. No.: 08/912,402

[22] Filed: Aug. 18, 1997

[51] Int. Cl.[6] .......................................................... G06F 1/26
[52] U.S. Cl. ........................ 713/300; 710/104; 710/129; 710/130; 713/1; 713/2; 713/330
[58] Field of Search ...................... 395/284, 309, 395/310, 750.01, 750.02, 750.03, 750.04, 750.07, 750.08, 651, 652, 653; 710/104, 129, 130; 713/1, 2, 100, 300, 310, 320, 330

[56] References Cited

U.S. PATENT DOCUMENTS

| | | | |
|---|---|---|---|
| 4,495,568 | 1/1985 | Gilbert et al. | 395/182.2 |
| 5,117,430 | 5/1992 | Berglund | 370/85.1 |
| 5,121,500 | 6/1992 | Arlington et al. | 395/750.07 |
| 5,481,730 | 1/1996 | Brown et al. | 395/750.08 |
| 5,497,490 | 3/1996 | Harada et al. | 395/653 |
| 5,542,077 | 7/1996 | Johnson et al. | 395/750.01 |
| 5,652,893 | 7/1997 | Ben-Meir et al. | 395/750.02 |
| 5,687,382 | 11/1997 | Kojima et al. | 395/750.03 |
| 5,724,592 | 3/1998 | Garner | 395/750.04 |
| 5,754,798 | 5/1998 | Uehara et al. | 395/284 |
| 5,754,852 | 5/1998 | Merkin et al. | 395/651 |
| 5,797,023 | 8/1998 | Berman et al. | 395/750.06 |

*Primary Examiner*—Ayaz R. Sheikh
*Assistant Examiner*—Xuan M. Thai
*Attorney, Agent, or Firm*—Chris Lynt; Matthew J. Bussan

[57] ABSTRACT

A plurality of information circuits are provided for a computer system. Each information circuit is associated with an element of the computer system and each stores data about the associated element of the computer system. The stored data is accessed by a control device of the computer system in order to configure predetermined operating parameters of the computer system elements.

20 Claims, 24 Drawing Sheets

NOTE:

the SPCN Code Level (the level of the code analyzing the vpd data) must be equal/ greater than the vpd level vpd level byte 34   hi nibble   lo nibble critical      noncritical
SRC              SRC "vpderitlev" and "vpdfunclev" are two values saved in the code load of the spcn node and used to match against the "level" of info in vpd chips.

FIG. 8B

APPARATUS AND METHOD FOR DETERMINING AND SETTING SYSTEM DEVICE CONFIGURATION RELATING TO POWER AND COOLING USING VPD CIRCUITS ASSOCIATED WITH SYSTEM DEVICES

CROSS REFERENCE TO RELATED PATENT AND PATENT APPLICATIONS

The subject matter of this application is related to U.S. Pat. No. 5,117,430, which issued May 26, 1992, and is assigned to the same assignee as the present application, the subject matter of which is hereby incorporated by reference. This application is also related to copending application Ser. No. 08/912,403, filed Aug. 18, 1997 (Pending), entitled "VITAL PRODUCT DATA CONCENTRATOR AND PROTOCOL CONVERTER" by NEIL C. BERGLUND, attorney docket number RO997-084-IBM-102, the subject matter of which is hereby incorporated by reference; and to co-pending application Ser. No. 08/912,561, filed Aug. 18, 1997 (Pending), entitled "FAIL-SAFE COMMUNICATIONS NETWORK FOR USE IN SYSTEM POWER CONTROL" by NEIL C. BERGLUND, attorney docket number RO997-083-IBM-101, the subject matter of which is hereby incorporated by reference.

BACKGROUND OF THE INVENTION

1. Field of the Invention

The invention relates to the field of computer systems management, and in particular, to a method and apparatus for determining and setting system device configuration relating to power, cooling, and the like, using information circuits associated with system devices.

2. Background Information

Many computer systems are designed and built to have a number of different possible configurations, for example, the IBM AS/400 system or the IBM RS/6000 system (IBM and AS/400 are registered trademarks of International Business Machines Corporation, and RS/6000 is a trademark of International Business Machines Corporation). The configurations may vary in the number of processors, the amount of memory, number of I/O devices and in the required amounts of power, cooling or power sequencing. It may be necessary to detect that certain components are present and correctly configured for the particular processor type used in the systems. It may be necessary to detect that certain voltages, e.g., cache memory voltage, are correctly set for the particular processor type being used in the system.

In the past, such configuration information was determined from configuration pins on backplane or processor cards, for example. However this method was limited by the number of available pins and the effort required to change the configuration identification. It sometimes required the changing of expensive components in order to force a change in the configuration identification when there was no other reason to change the components. For example, changing backplanes could be necessary to force a change to the configuration pins, when otherwise the backplanes would not need to be changed.

Therefore, a need existed for a way of determining device characteristics without the disadvantages and limitations of using configuration pins.

SUMMARY OF THE INVENTION

It is, therefore, a principle object of this invention to provide a power configuration method and apparatus.

It is another object of the invention to provide a power configuration method and apparatus that solves the above mentioned problems.

These and other objects of the present invention are accomplished by the power configuration method and apparatus disclosed herein.

According to one aspect of the invention, an enhanced way of determining device characteristics is provided.

According to another aspect of the invention, information circuits are added, which may be in the form of smart card vital product data (VPD) chips, to the system processors, backplanes, and memory cards of a computer system to provide configuration and asset information. For example, the information circuits in the form of serial smart card VPD chips, are added to various computer system components in an IBM AS/400 or RS/6000 system, for example, in order to provide device specific information.

According to another aspect of the invention, a field referred to as "power VPD" is allocated within the VPD chips added to processors, memories, backplanes, and the like, to identify characteristics related to power and cooling requirements.

According to another aspect of the invention, these chips and a VPD concentrator (which is the subject matter of related co-pending application attorney docket RO997-084-IBM-102, referenced above) are provided with a separate controllable voltage source, e.g., 5 v, controlled by a system power control network (SPCN), so that SPCN can selectively apply power to the VPD chips and read the power configuration data therefrom before power is applied to the rest of the computer system. This provides the ability to configure the power and cooling system and make any critical checks before power is applied to the entire computer system, thereby avoiding the risk of damaging the computer system components through the application of incorrect voltages or insufficient cooling, for example.

According to another aspect of the invention, when the computer system power-on key is pressed to turn on power to the system, power to the VPD components is switched on first, and the relevant data is read from all processors, backplanes, and memory cards. The data read from the VPD chips is checked and validated, and then used to configure the associated power system with cooling speeds, power sequencing requirements, processor type (e.g., IBM AS/400 or RS/6000) and cache voltage requirements, etc.

According to another aspect of the invention, any failure to access power VPD information which could damage components will prevent system power on. However, other less critical failures will allow power on of the system, but will cause a display and/or log of the faults causing the failures.

According to a further aspect of the invention, the VPD chips are added to electronic circuit cards in the Central Electronics Complex (CEC), which is the site of the host CPU, and to expansion towers of the system. The VPD chips contain specific power data, referred to herein as "power VPD," used for the purpose of configuring the power/cooling/concurrent maintenance sub-system of the computer system. Various device characteristics identified by power VPD are examined before power is applied to the system to prevent potential damage to hardware.

According to another aspect of the invention, other various device characteristics are also identified by power VPD, such as information necessary to properly power external towers, control blower speeds, and control direct access storage device (DASD—disk drive) power for concurrent maintenance.

DETAILED DESCRIPTION OF THE PREFERRED EMBODIMENTS

Figure 1A:
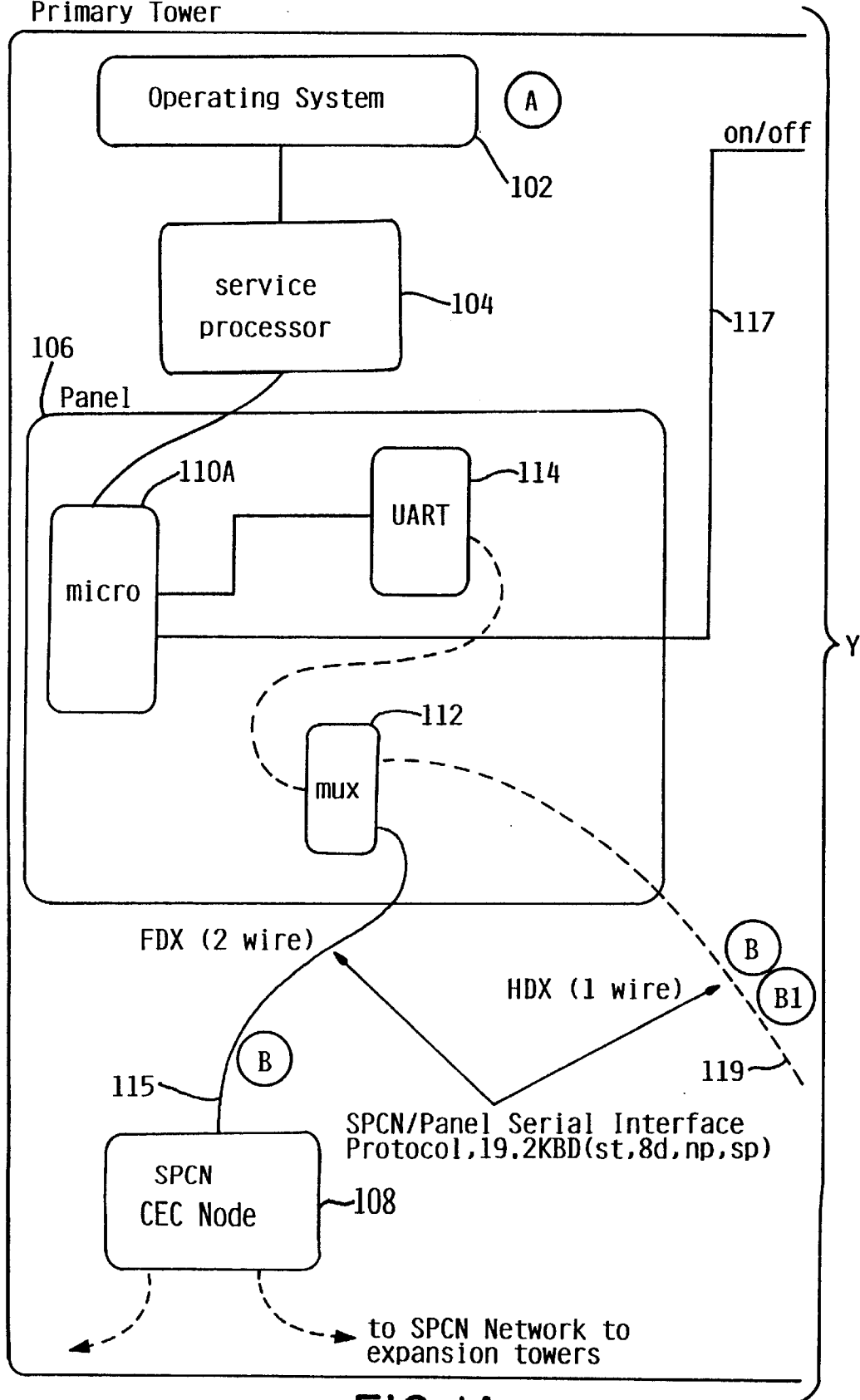
FIG. 1 illustrates a VPD hardware interface in one model of a computer system utilizing an embodiment of the present invention.

The invention will now be described in more detail by way of example with reference to the embodiments shown in the accompanying figures. It should be kept in mind that the following described embodiments are only presented by way of example and should not be construed as limiting the inventive concept to any particular physical configuration.

The invention will now be described by way of a computer system utilizing an exemplary embodiment of the present invention. The various processing elements of such a computer system, including racks and/or towers, may be interconnected by a control network, e.g., the system power control network (SPCN). The SPCN was designed as a low volume serial network used to monitor power conditions at a plurality of nodes in a computer system of racks/towers, in particular, the IBM AS/400. The nodes typically include microprocessors which monitor the status of, and make occasional adjustments to, the power conditions at the respective nodes. A tower is a small rack typically containing a tower node processor and only one slave processor, while a rack typically contains a rack node processor and several slave processors. A primary rack or tower of the network also contains a central electronics complex (CEC) with the network "master" processor, as well as the computer system CPU. Such a network is the subject matter of the inventor's prior Pat. No. 5,117,430, and an enhanced network is the subject matter of the inventor's co-pending related application attorney docket RO997-083-IBM-101, referenced above.

As mentioned at the outset, an enhanced way of determining device characteristics is provided. Information circuits are added to system processors, backplanes, and memory cards of a computer system to provide configuration and asset information. A preferred embodiment of the invention uses smart card VPD chips. These smart card VPD chips provide secure, i.e., encrypted, data storage, and communicate using half-duplex, asynchronous block protocol, such as described in the international communication standard, ISO 7816-3. However, this communications standard provides limited addressability and, for that reason, and in consideration of electrical loading and performance reasons, a large number of smart card VPD chips cannot be connected to a common, multi-dropped interface. Further, since failures on a multi-dropped interface can preclude communication with all chips, and since communication with a subset of the VPD chips 120 is required to successfully operate the system, a more robust design uses point-to-point interlaces. This in turn creates the need to concentrate a large number of point-to-point interfaces to a common transfer point for communication with the system. A way of concentrating the signals from the VPD chips 120 to a control point, and further a way of handling the special protocol requirements of the VPD chips 120 within an existing system's network protocol, e.g., SPCN, are the subject of the related co-pending application attorney docket number RO997-084-IBM-102, referenced above.

Figure 1B:
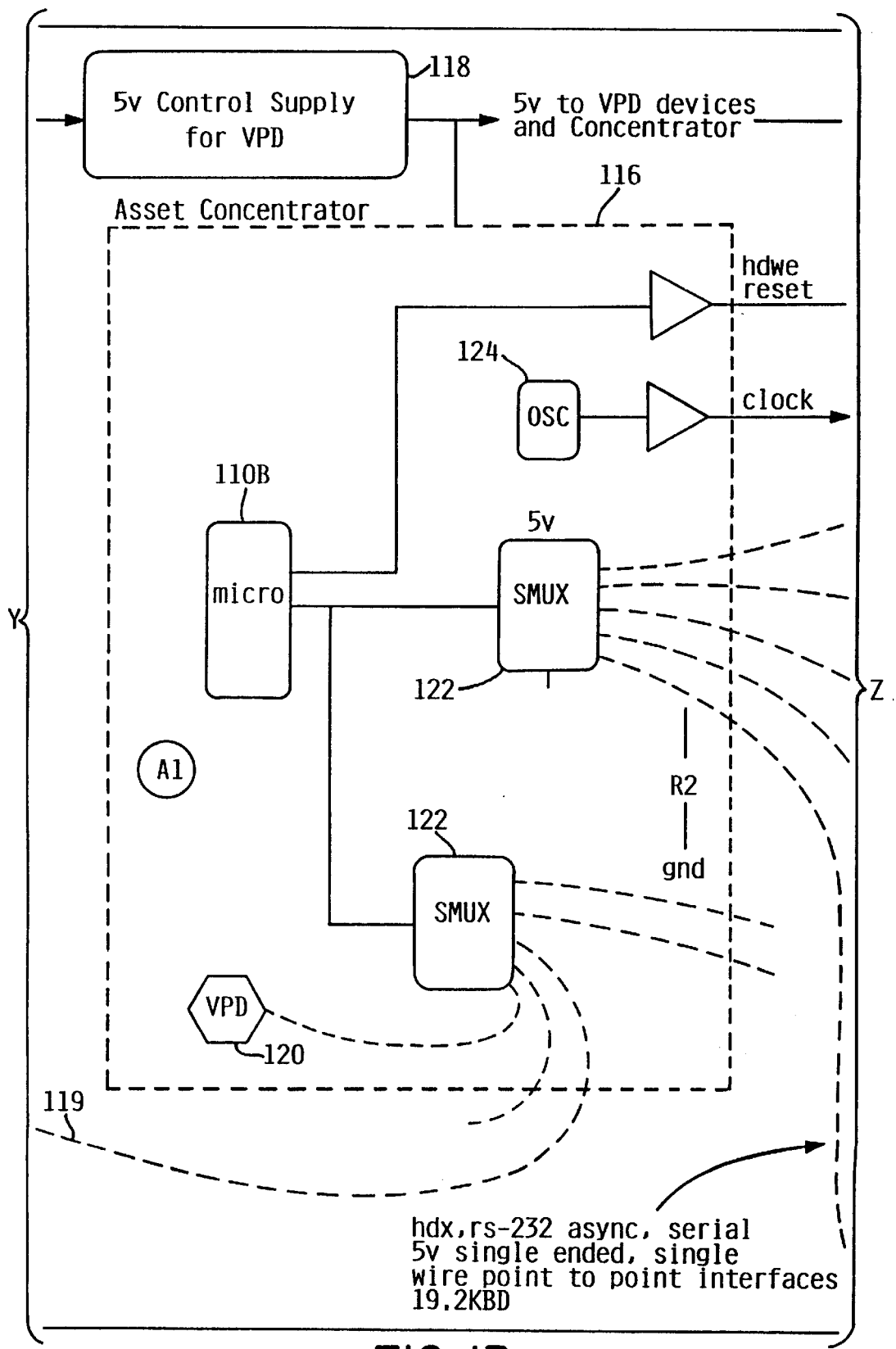
Figure 1C:
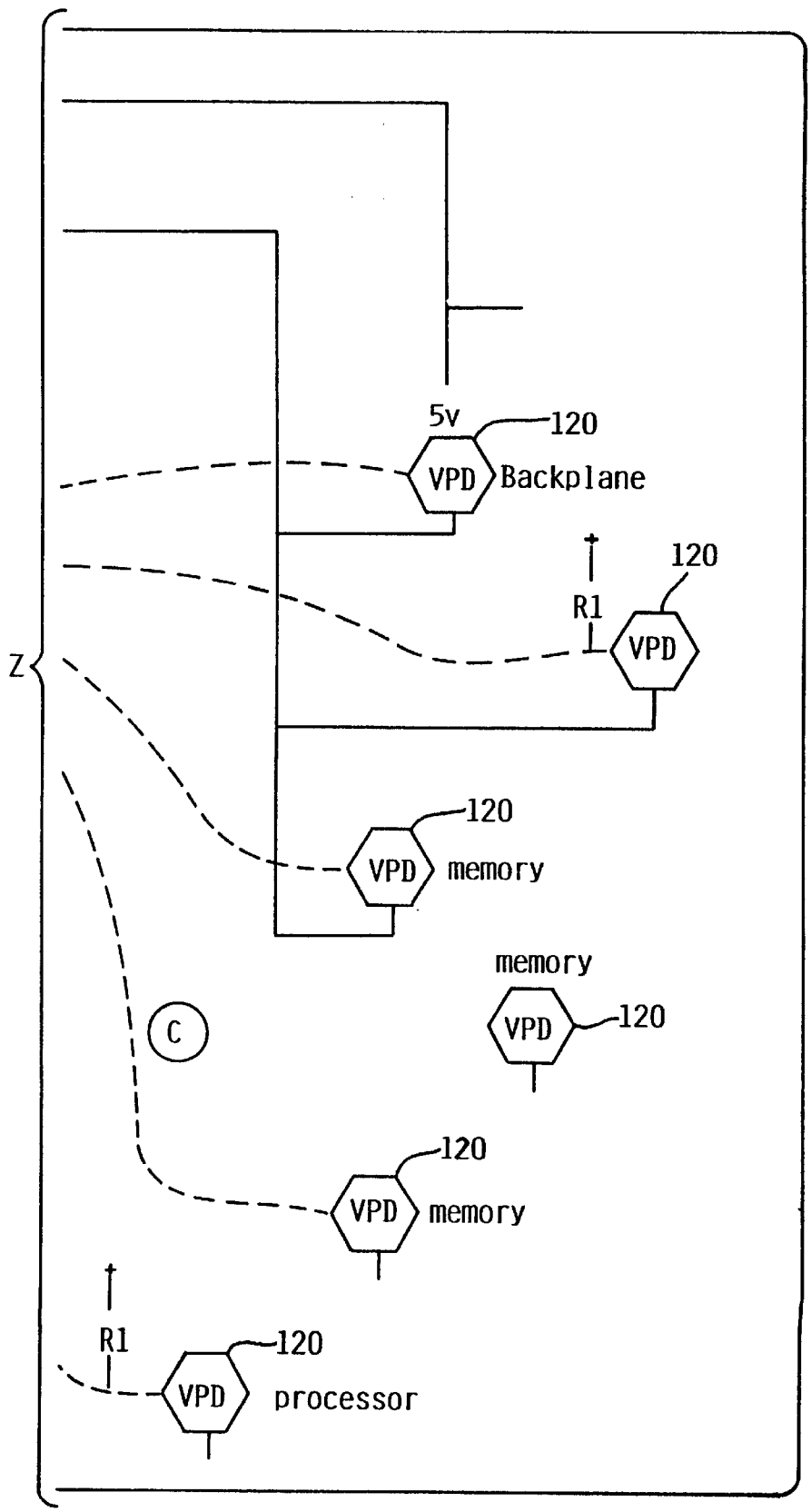
Figure 2A:
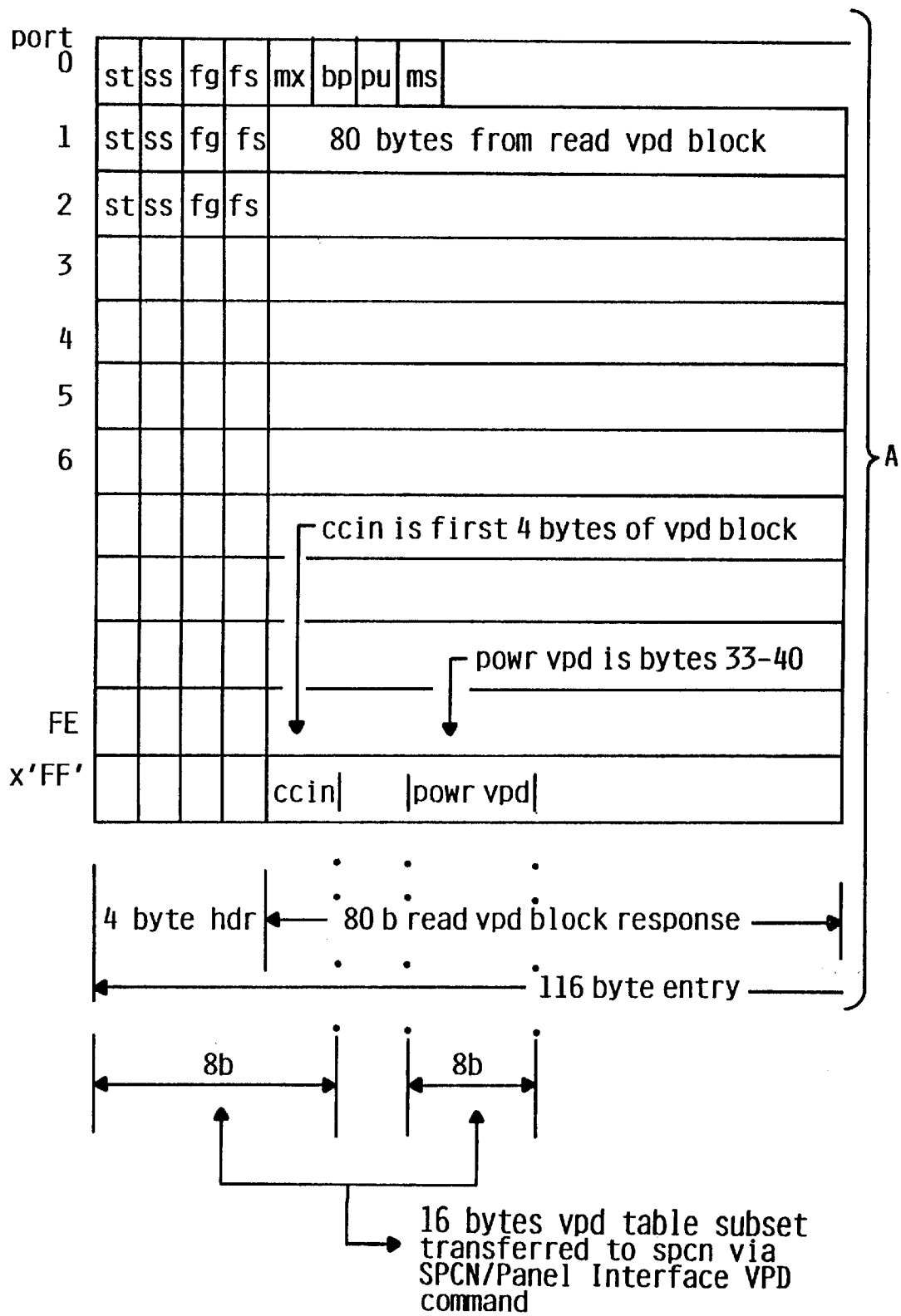
FIG. 2 illustrates an exemplary VPD Table according to an embodiment of the invention.
Figure 2B:
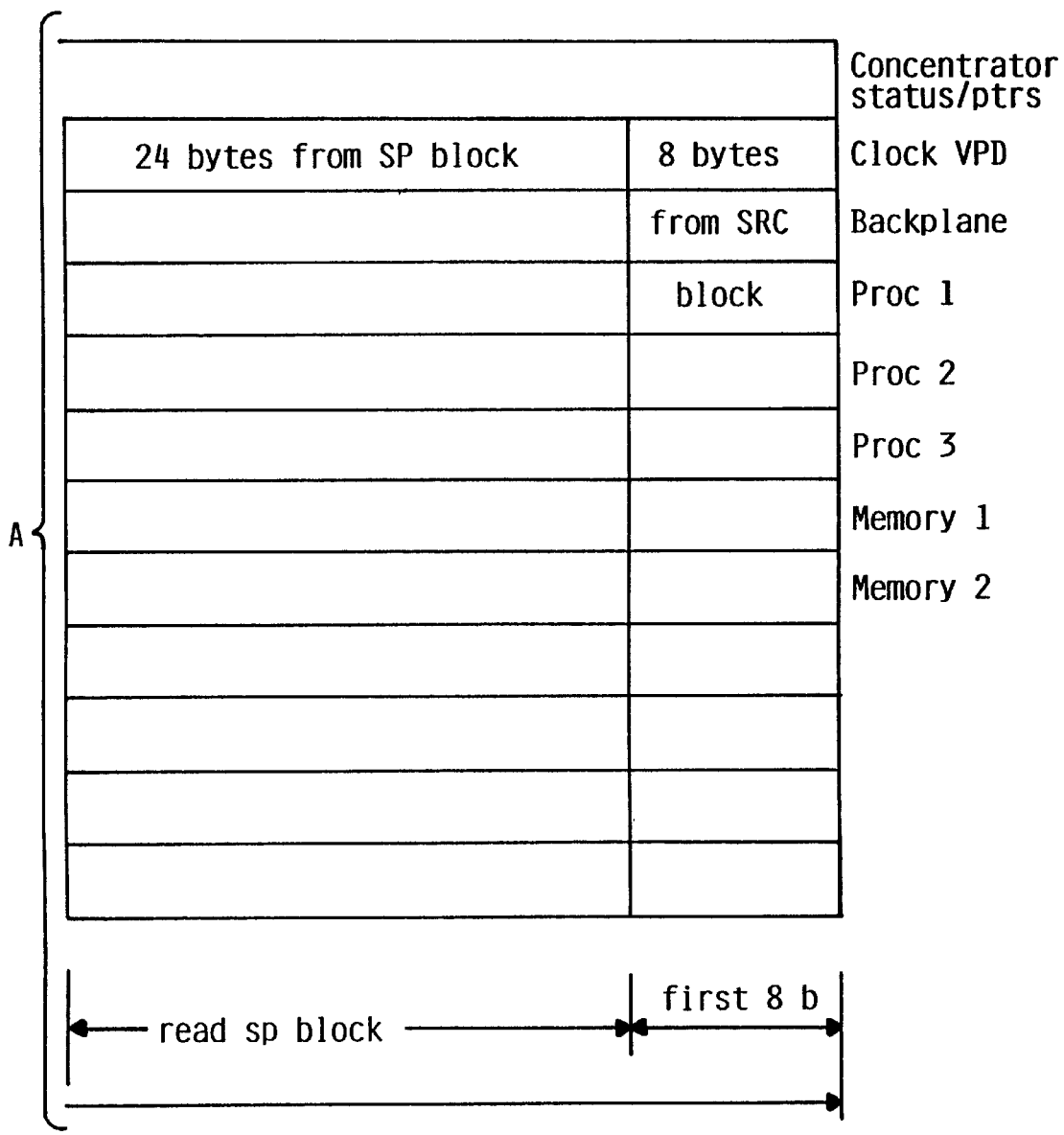
Figure 2C:
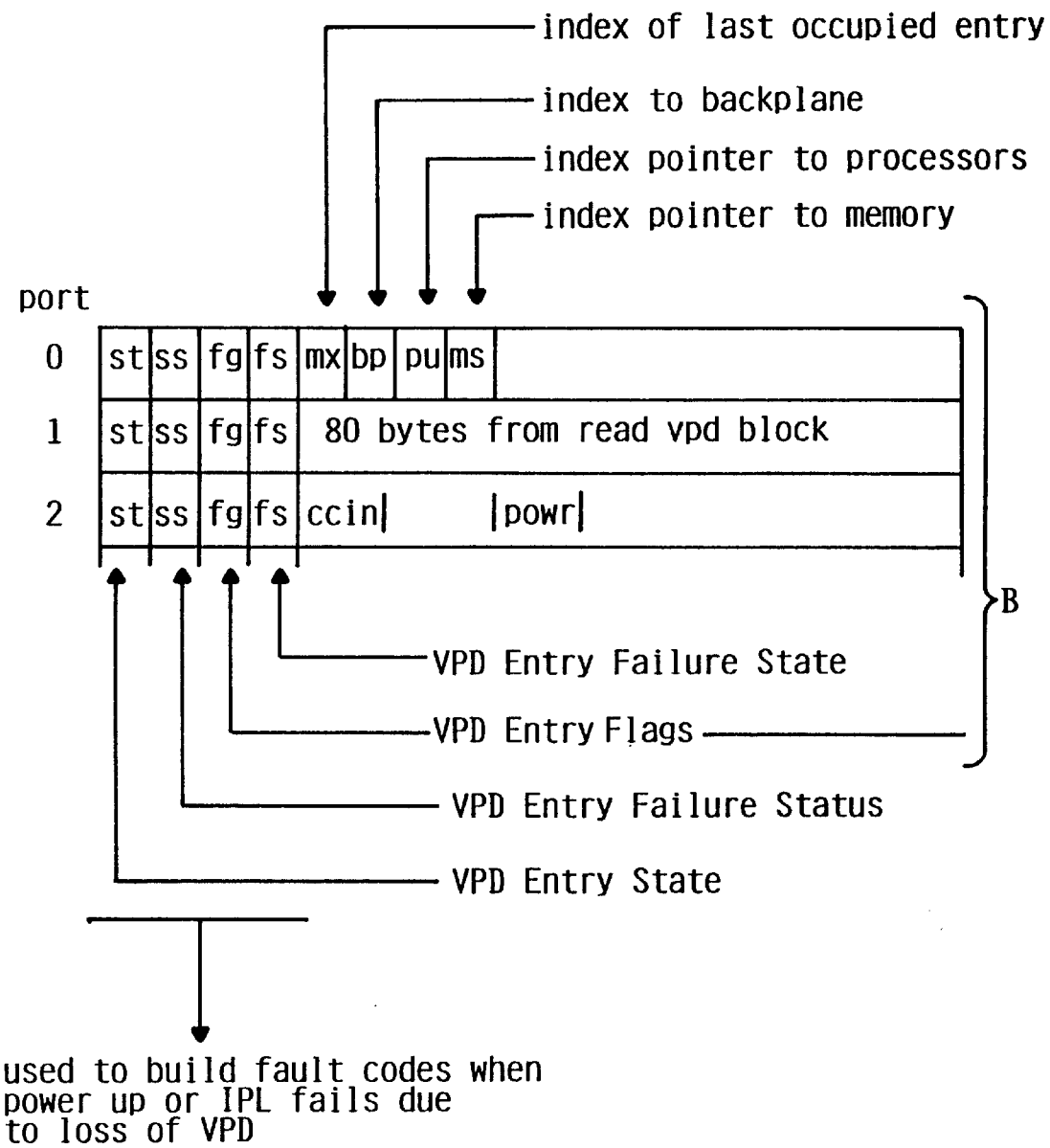
Figure 2D:
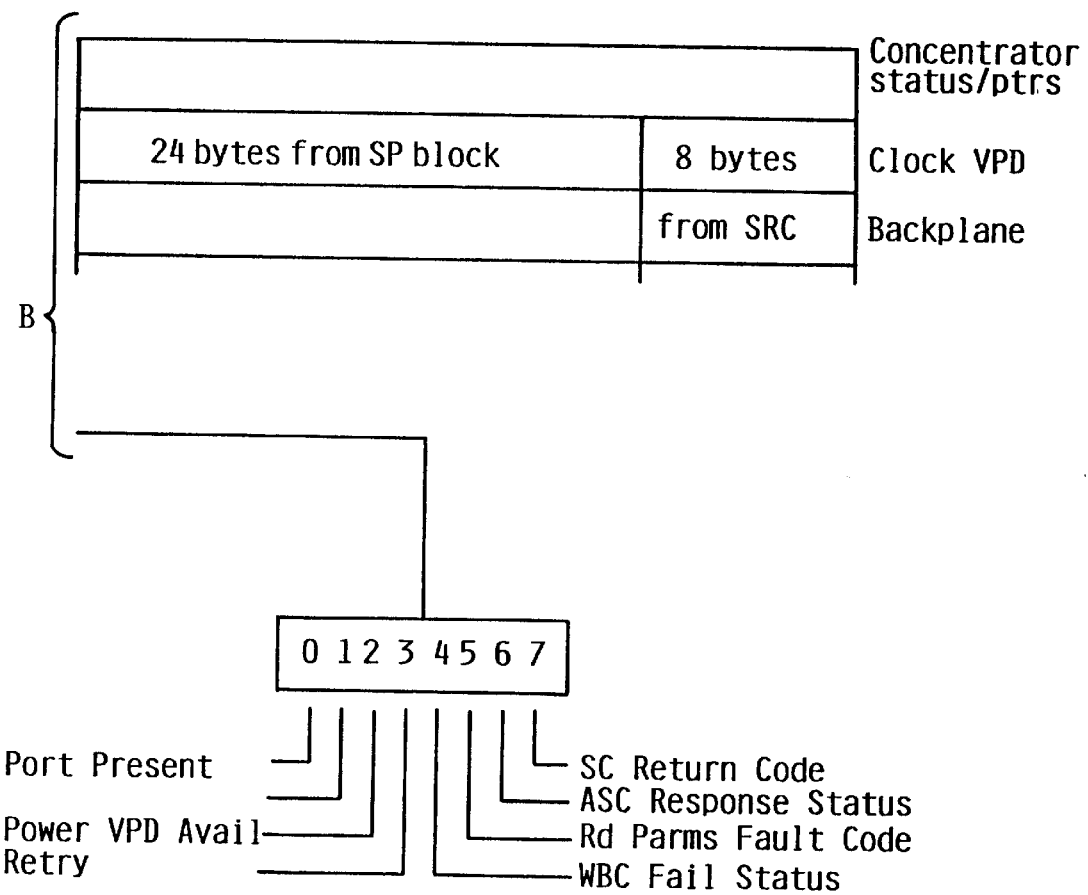

The example shown in FIG. 1 of a computer system including smart card VPD chips 120, includes concentrator 116 providing the communication transfer point between the VPD chips 120 and a central control device, in this case the operating system 102, service processor 104 and panel 106. As is illustrated, the VPD chips 120 are associated with various representative system devices or "elements," e.g., memories, processors and backplanes. Although not shown, the VPD chips 120 are also added to electronic circuit cards in the Central Electronics Complex (CEC) 108, which is the site of the host CPU, and to similar devices in expansion towers of the SPCN system.

In this exemplary embodiment, the panel 106 accesses data from the VPD chips 120 and builds a table, such as the VPD Table shown in FIG. 2, from this data. This data may be collected when a power-on request is detected, for example. The data is used by the system service processor 104 to configure processor and memory parameters, and by the power controller (SPCN) to configure the requirements of the power-cooling-concurrent maintenance system. As mentioned at the outset, a field referred to as "power VPD" is allocated within the VPD chips added to processors, memories, backplanes, and the like, to identify characteristics related to power and cooling requirements. Other various device characteristics are also identified by power VPD, such as information necessary to properly power external towers, control blower speeds, and control direct access storage device (DASD—disk drive) power for concurrent maintenance.

The table shown in FIG. 2 is annotated and is self-explanatory. The specifics shown are only representative of one way of implementing the present invention. However, as one skilled in the art would realize, the invention is not limited to the specific implementation and may be implemented in many different ways. The first entry of the table contains indecies used to locate other entries. The "mx" field identifies the last entry found to have a VPD chip 120 connected. The "bp", "pu" and "ms" entries identify the location of backplane, first processor, and first memory card, respectively.

In the table of FIG. 2, the first four bytes of each entry are the header, and include state "st," status "ss," flags "fg," and failure status "fs." These bytes are used to identify the exact point of failure if the VPD data for one or more ports is unable to be successfully retrieved. From this data a System Reference Code (SRC) or "fault code" can be built to identify the component requiring repair.

The State field indicates the last successful step or state achieved in the process to collect the VPD data from a port. A value of Hex 18 indicates all the data was successfully accessed. Any other value indicates a failure and incomplete access of the data for this port.

The Failure Status field contains error status to further identify the cause of failure at the particular failing step in the process to collect the VPD data.

The Failure Flags are shown at the bottom of FIG. 2 and contain flags to identify the kind of status code in the Failure Status field, in addition to indicating Port Present, VPD available, etc.

"Port Present" indicates a VPD chip was detected at this port address.

"Power VPD Available" indicates whether or not the Power VPD information was successfully retrieved or not for each port. This flag, however, does not imply that all vital product data at this port was successfully retrieved. The state field must be inspected to make such a determination.

The Retry flag indicates whether or not a retry was incurred in order to retrieve the data for this port.

WBC Fail Status indicates whether or not the Write Block Control command, which is used to transport a command to the concentrator 116 from the panel 106, has failed. A failure would be indicative of a failure in the panel 106 to concentrator 116 interface. The Failures Status field will contain a code to identify the type of failure, e.g., CRC (cyclic redundancy check) check failure, no response time-out, etc.

The read parameters fault code ("Rd Parms Fault Code") indicates that the concentrator 116 detected a fault with a port. This fault code is retrieved by a command to the concentrator 116 via the Read Parms command.

ASC (Asset Control Command) response status indicates the status code in the Failure Status field contains an unsuccessful response status from the ASC or ASD (Asset Data) command. This indicates a failure detected by or in the concentrator 116.

The SC Return Code indicates the status code in the Failure Status field contains a non-zero return code from the VPD device. This indicates a failure in the VPD device.

The Failure Status byte contains the state value (the step in the process) where a failure first occurred.

One hundred twelve (112) bytes of VPD are collected in three pieces from the VPD chips 120 to satisfy system configuration and vital product data requirements in the illustrated exemplary embodiment. Of these 112 bytes, eight bytes in the first piece, the VPD block, are specifically allocated for power configuration data. The first four bytes of the VPD block are the CCIN (Card Component Identification Number). This is a unique number to identify the particular component, e.g., processor, memory, etc. The remaining fields are defined to identify the respective components for the benefit of the service processor 104 and operating system 102. They include such information as the card serial number, etc., and need not be described further for an understanding of the invention.

Of course, the illustrated example is presented for illustrative purposes only, and one skilled in the art would realize that the present invention is not limited to the particulars presented. Variations from the specifics described throughout this disclosure are considered to be within the scope of the invention defined by the claims.

As mentioned at the outset, these chips 120 and the VPD concentrator 116 (which is the subject matter of related co-pending application attorney docket RO997-084-IBM-102, referenced above) are provided with a separate controllable voltage source 118 providing a voltage, e.g., 5 v, which may be controlled by a system power control network (SPCN), so that SPCN can selectively apply power to the VPD chips 120 and read the power configuration data therefrom before power is applied to the rest of the computer system. This provides the ability to configure the power and cooling system and make any critical checks before power is applied to the entire computer system, thereby avoiding the risk of damaging the computer system components through the application of incorrect voltages or insufficient cooling, for example.

In the embodiment of FIG. 1, the panel 106 can operate to power on the VPD chips 120 with a control voltage through the control supply 118 prior to powering up the rest of the computer system. The control voltage for the VPD chips 120 is turned on and data is collected and stored in the VPD Table. At least some of this data is provided to the power controller (SPCN) to use in powering on the rest of the system. All of the data in the VPD Table would be transferred to the service processor 104 during initial program load (IPL). The control voltage may remain on while the rest of the system is powered on, but is turned off when the system is turned off so that insertion/removal of various device cards (Field Replaceable Units) does not create a so-called "hot plug" condition for the VPD chips 120.

In other computer systems, control power might not be provided to the VPD chips 120 prior to system power on, and the VPD chips 120 in that case, are only accessed after system power is turned on. As mentioned at the outset, in an exemplary use, when a computer system power-on key is pressed to turn on power to the system, power to the VPD chips 120 is switched on first, and the relevant data is read for all processors, backplanes, and memory cards, etc., in the system. The data read from the VPD chips 120 is checked and validated, and then used to configure the associated power system with cooling speeds, power sequencing requirements, processor type, and cache voltage requirements, etc.

However, powering up the system sometimes cannot be delayed by the time required to collect VPD data from every port in the system. In such cases, the collection of VPD data is divided into two parts based on the criticality of the data. Critical information necessary to power up the system would be collected first so that power up can be accomplished in the minimum time required. Less critical information would be collected thereafter.

The power vital product data information, "Power VPD," is contained in each smart card VPD chip 120. Some of the information may be examined prior to applying power to the system to prevent hardware damage. Other information may be used to properly power external towers, control blower speeds, and control direct access storage device (disk drive) power for concurrent maintenance.

Figure 3A:
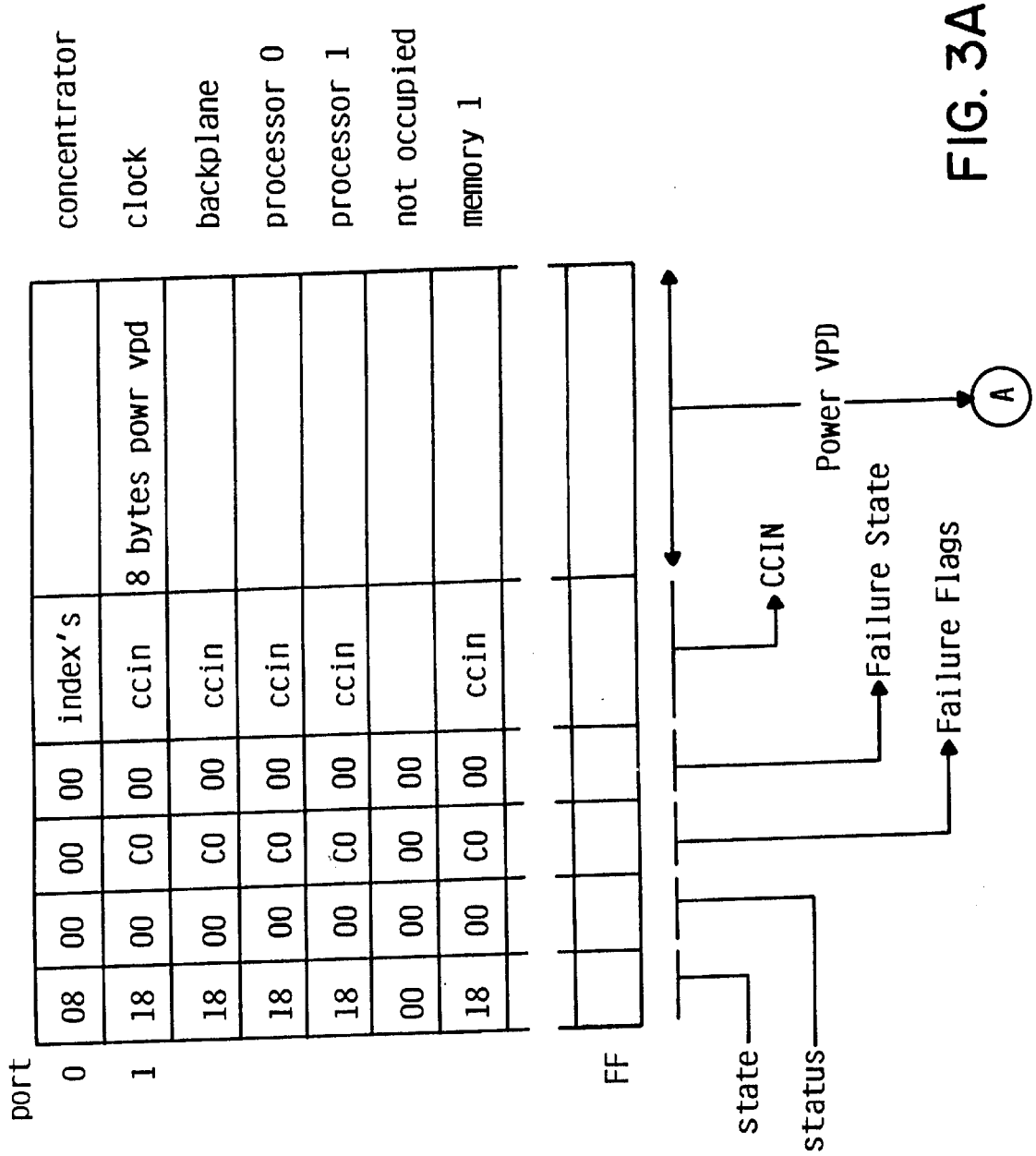
FIG. 3 illustrates a representative example of system power control network (SPCN) power configuration data according to an embodiment of the invention.
Figure 3B:
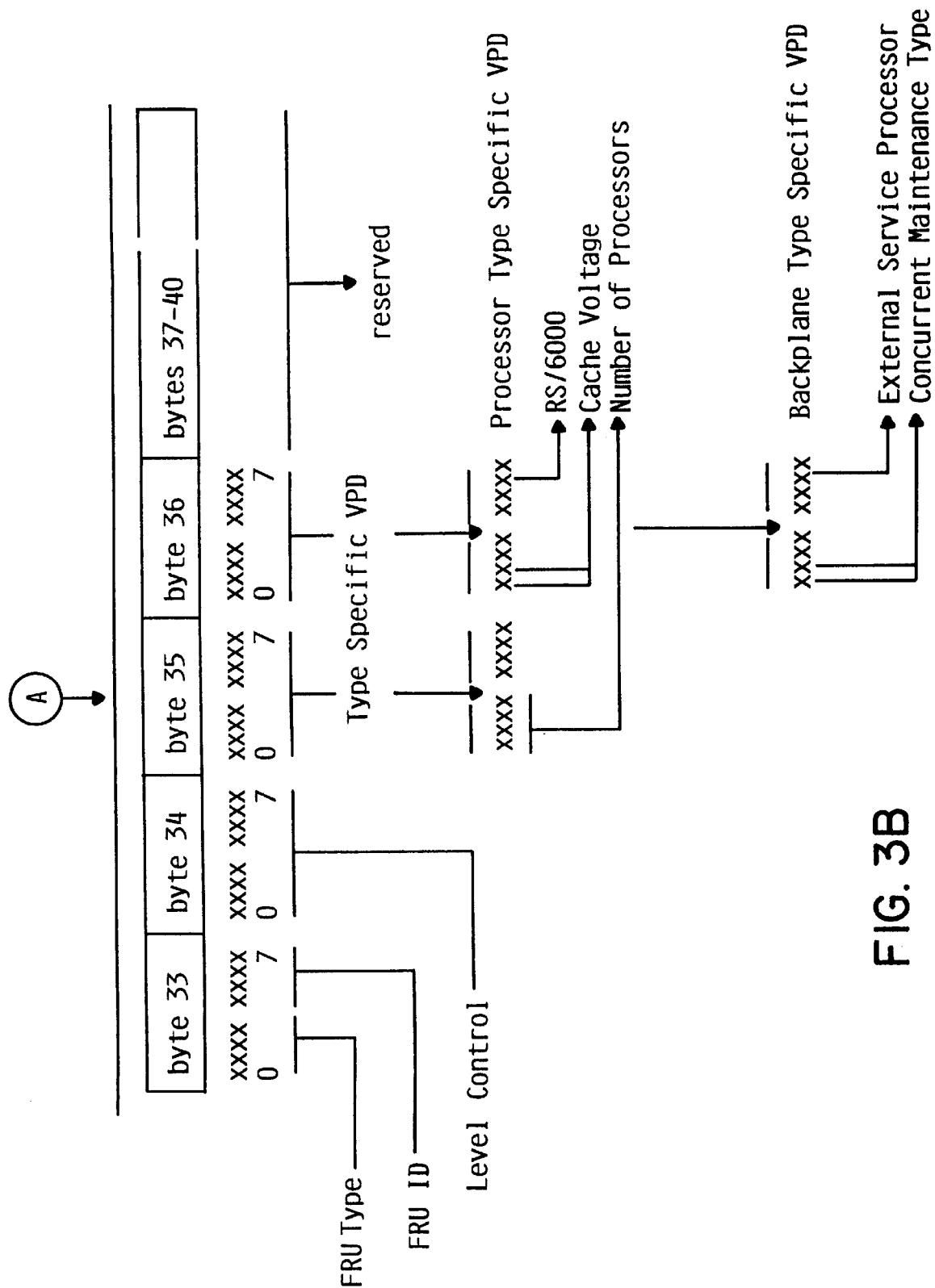

FIG. 3 illustrates a representative example of system power control network (SPCN) power configuration data. At the top of FIG. 3 in table form, a portion of the VPD table of FIG. 2 is shown. The power VPD table is a subset which is extracted by the panel from the system VPD table and transferred to SPCN in response to a request from SPCN. Each entry is sixteen bytes and is composed of the four byte header, the four byte CCIN field, and the eight byte power VPD data. An expansion of a representative Power VPD information field is shown at the bottom of the figure. The information encoded in the representative Power VPD field will now be explained.

FRU Type and FRU ID identifies the class of FRU, i.e., clock, backplane, processor, or memory, and identifies the FRU within its class. The ID is not predetermined according to fixed rules, but is selected by SPCN based on the power/cooling characteristics of the FRU that are significant to SPCN control of the power/cooling subsystem.

The VPD Level Control identifies the level of the VPD in this FRU. A mechanism is required to identify the "level" of the VPD architecture in each VPD chip 120 in order to guarantee correct interpretation of the VPD contents by the power controller (SPCN). This is necessary because components with expanded VPD definitions, e.g., new fields to interpret, may be installed in systems whose power controller (SPCN) microcode is not at a compatible level so as to be able to correctly interpret the new VPD content. A mismatch between the level of VPD and the SPCN code that has to interpret the VPD means that the system may not be properly configured, or that circuit damage conditions could potentially exist.

Two "level" fields are provided in the Power VPD Data. SPCN will detect a mismatch between the level of data in the VPD chip 120 and the power controller's (SPCN's) ability to interpret the data. If a mismatch occurs in the "critical level" field, the power controller (SPCN) will not allow a system power up in order to protect against potential damage. If a mismatch occurs in the "non-critical level" field, then the power controller (SPCN) will set default values for the parameters it cannot determine and report a fault to identify the mismatch condition. For example, if the number of fans cannot be determined, then the power controller (SPCN) will not power on to protect against circuit damage. However, if the cooling speed cannot be determined, it can be defaulted to maximum and a power up attempted.

The two Type Specific VPD bytes each define characteristics necessary to configure the power/cooling system, and are unique to the type of FRU. Additional bytes are reserved for optional additional information and/or future Power VPD expansion, as needed.

Power VPD is advantageously defined so that the power controller (SPCN) can determine power and cooling requirements by examining architected fields within the VPD Data. For example, Byte 36 may contain a field with defined values to indicate that the required cache voltage is 3.3 volts or 2.5 volts. This field has meaning independent of any unique identification of the particular processor provided by the CCIN field. If instead, cache voltage were determined by a table lookup of appropriate values based on CCIN identification, then every time a new processor type is introduced, a new table entry would be required in the power controller (SPCN) to be able to properly configure the system. This would mean that all systems already installed could not be upgraded with a new processor until the power controller (SPCN) code is first upgraded to recognize the new processor type.

Although the CCIN value is not the most advantageous way to determine power configuration as just explained, the CCIN field is included with the Power VPD so that the power controller (SPCN) still has the ability to provide unique power or cooling requirements for a particular component based on the CCIN. This solution would be used in situations where it is not possible to architect a generic status in the Power VPD fields to satisfy a component's unique requirements.

Figure 4A:
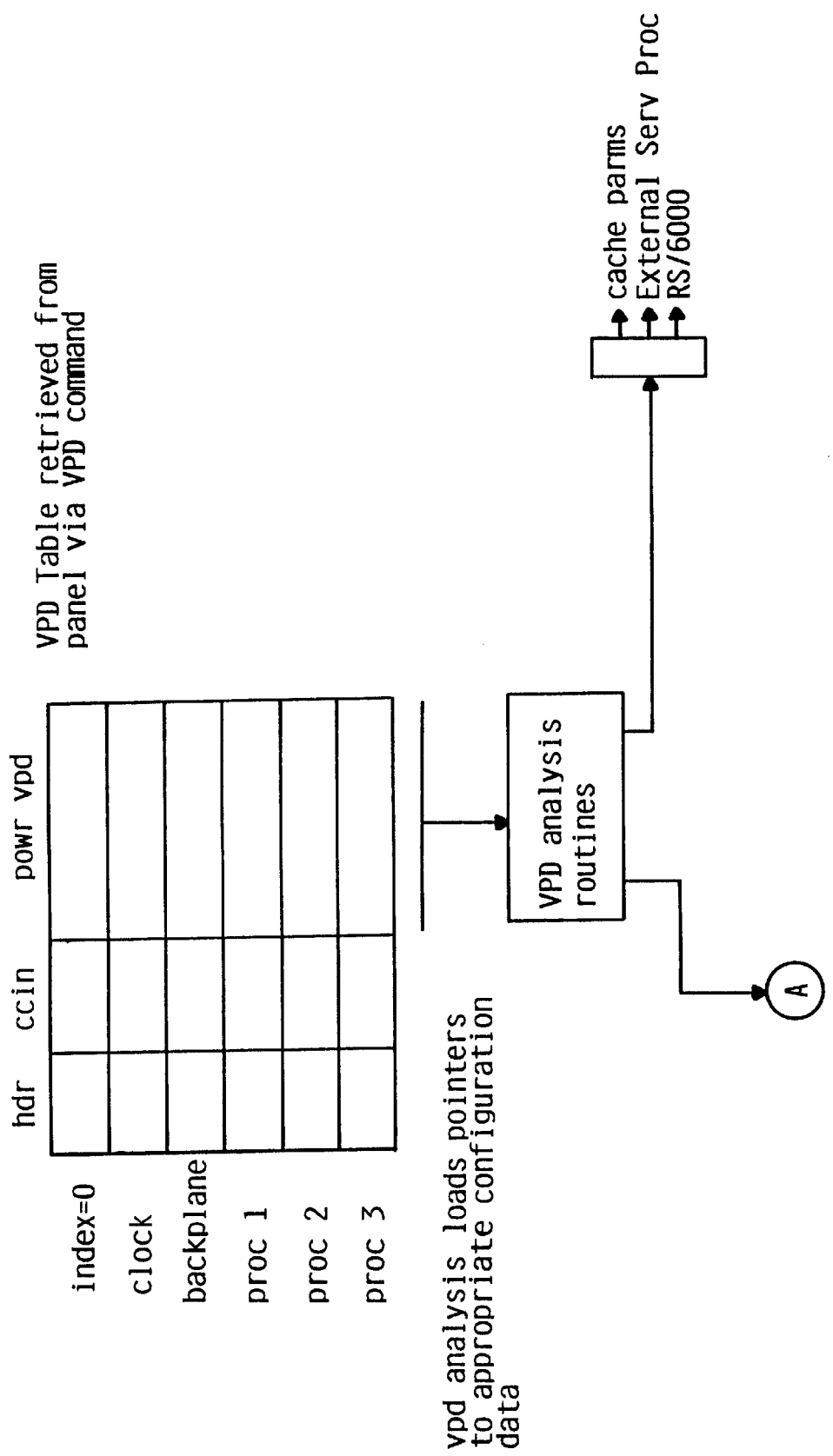
FIG. 4 illustrates configuration determining according to an exemplary embodiment of the invention.
Figure 4B:
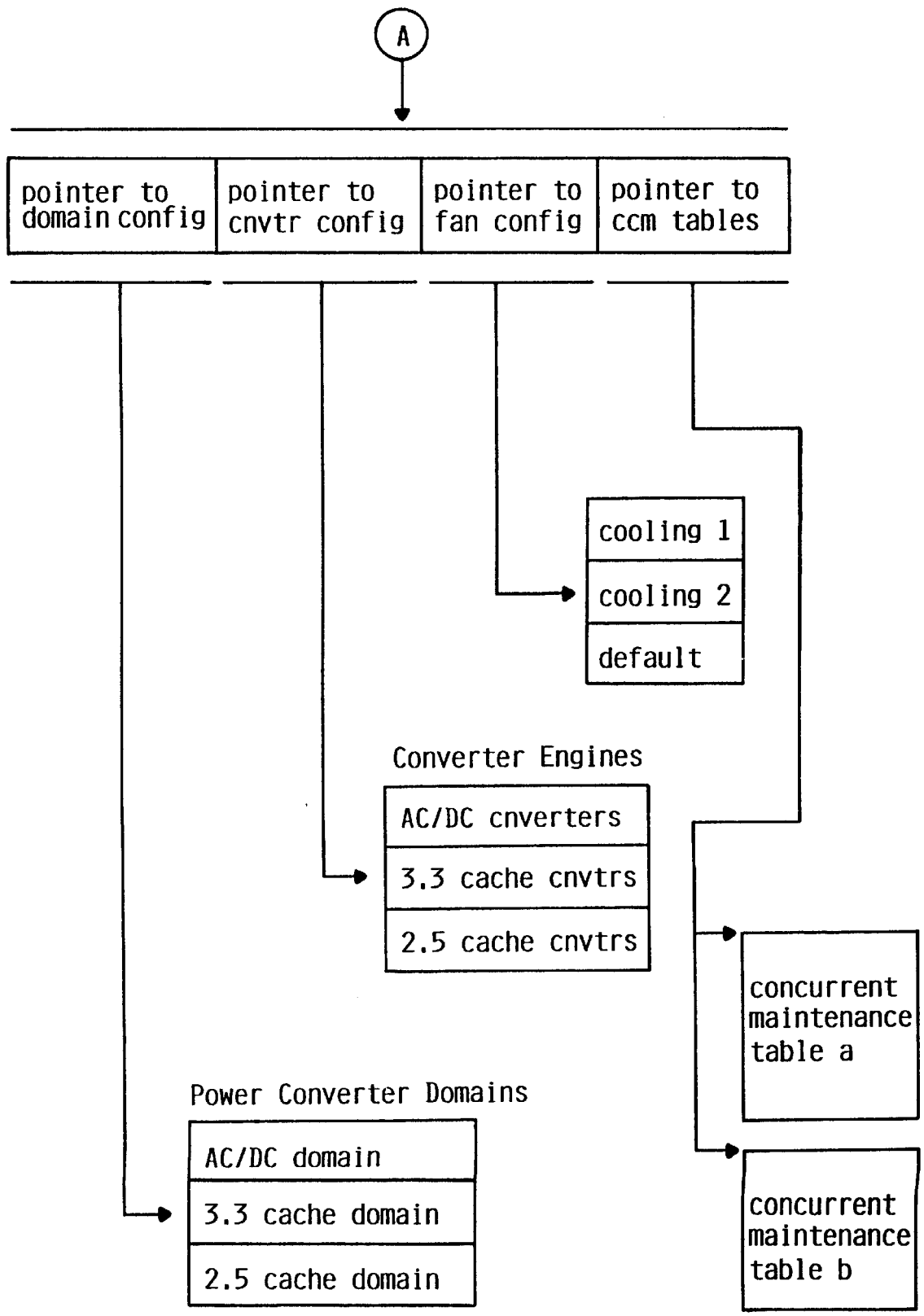

FIG. 4 illustrates determining configuration according to an exemplary embodiment of the invention. At the top of the figure is represented a VPD table retrieved from the panel 106 via a VPD command, and, in particular, the Power VPD ("powr vpd"). Below that is shown that the power VPD analysis loads pointers to the appropriate configuration data.

Exemplary cache parameters are also illustrated in FIG. 4. These cache parameters identify the cache voltage required for a particular processor according to an exemplary embodiment of the invention.

Figure 5A:
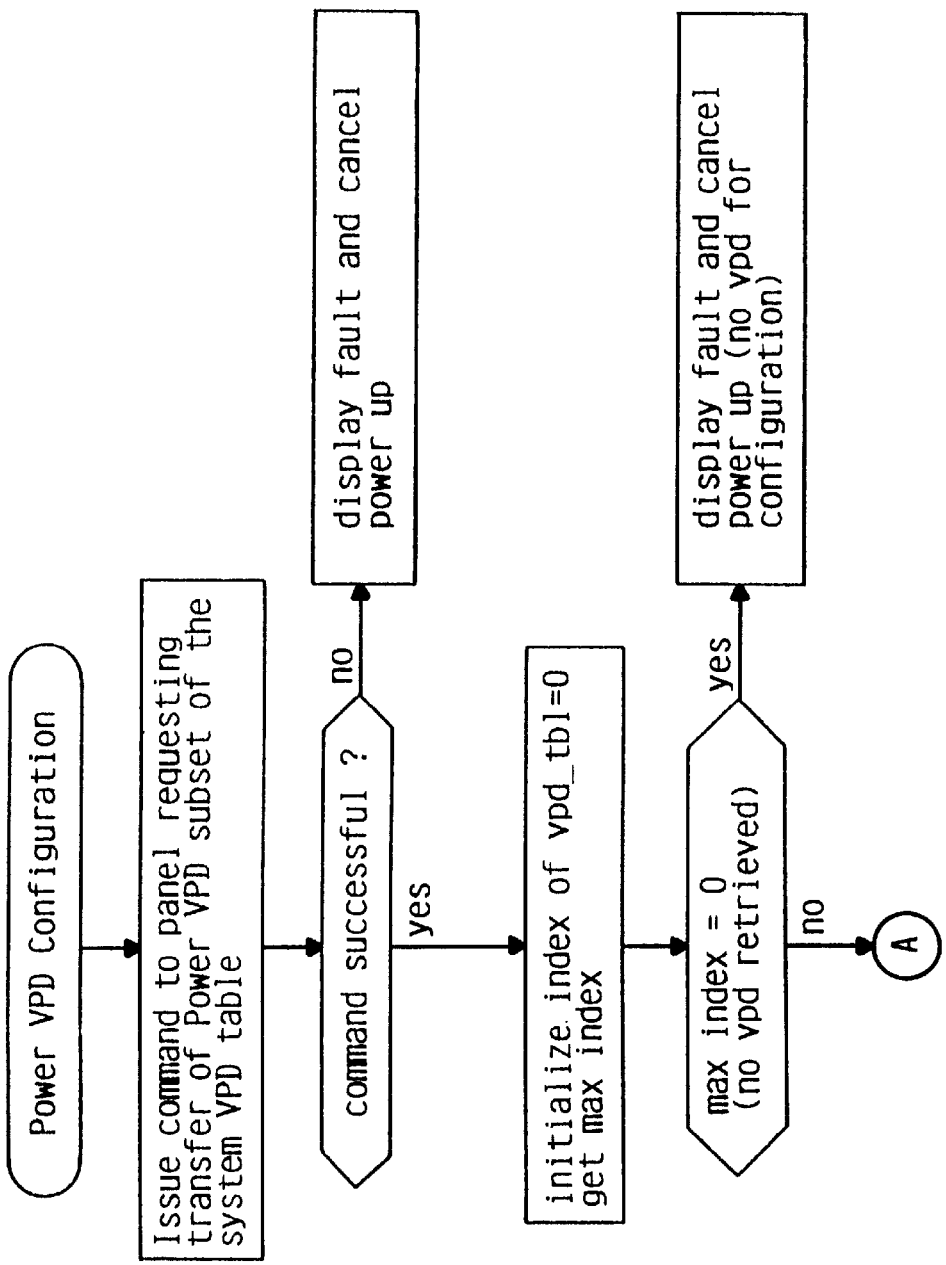
FIG. 5 illustrates a process of power configuration according to an exemplary embodiment of the invention.
Figure 5B:
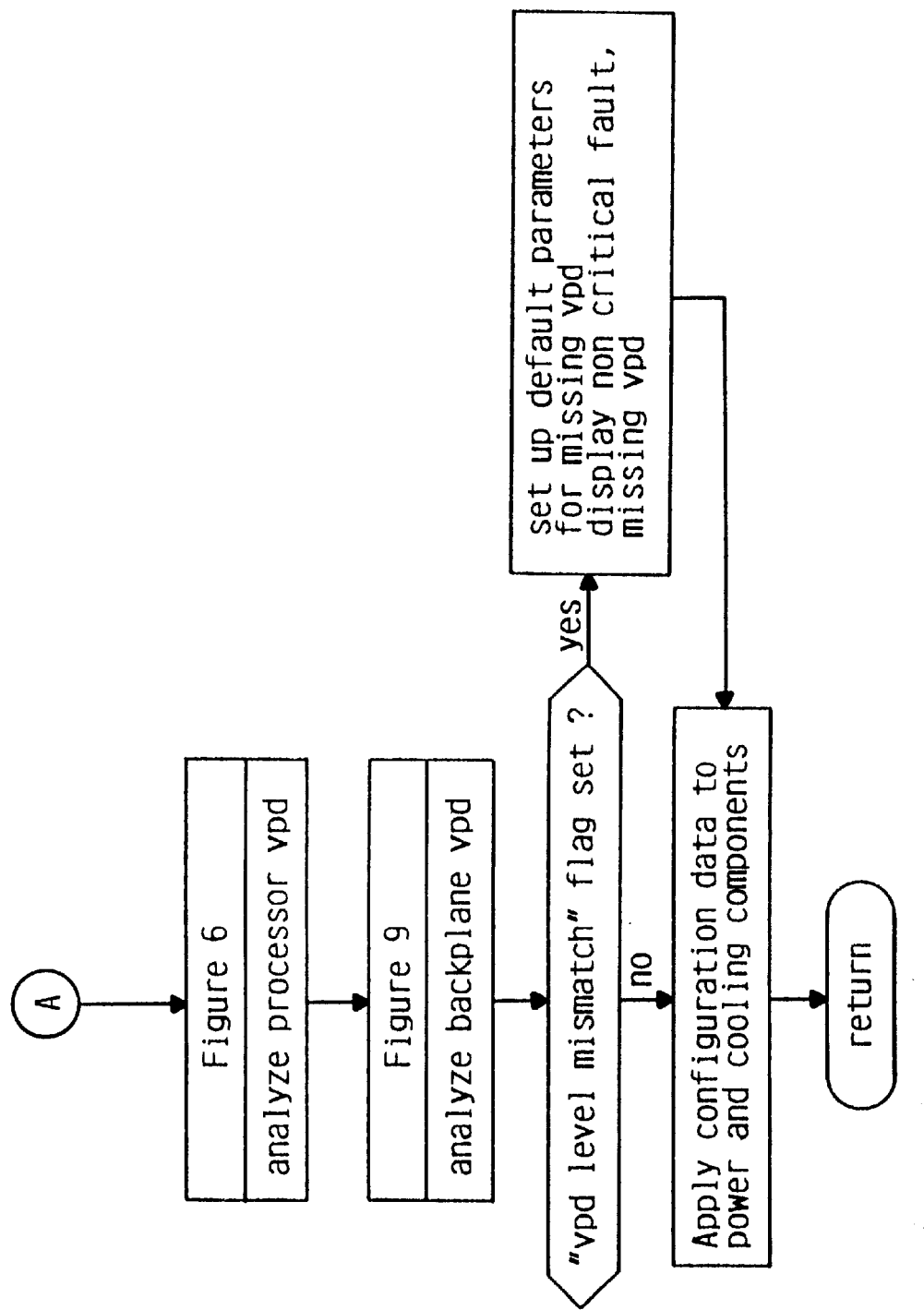
Figure 6A:
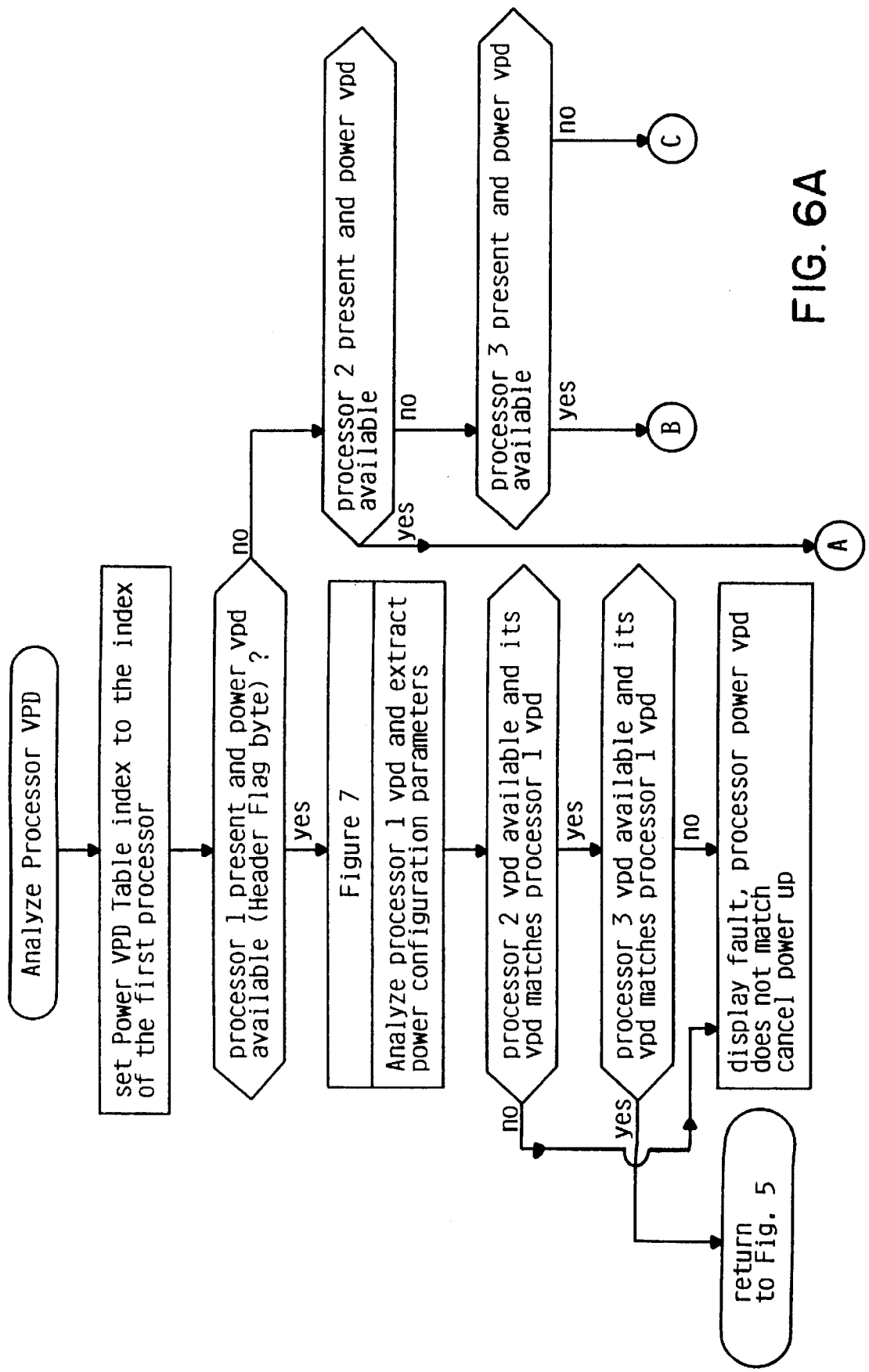
FIG. 6 illustrates a process of multi-processor power VPD validation according to an exemplary embodiment of the invention.
Figure 6B:
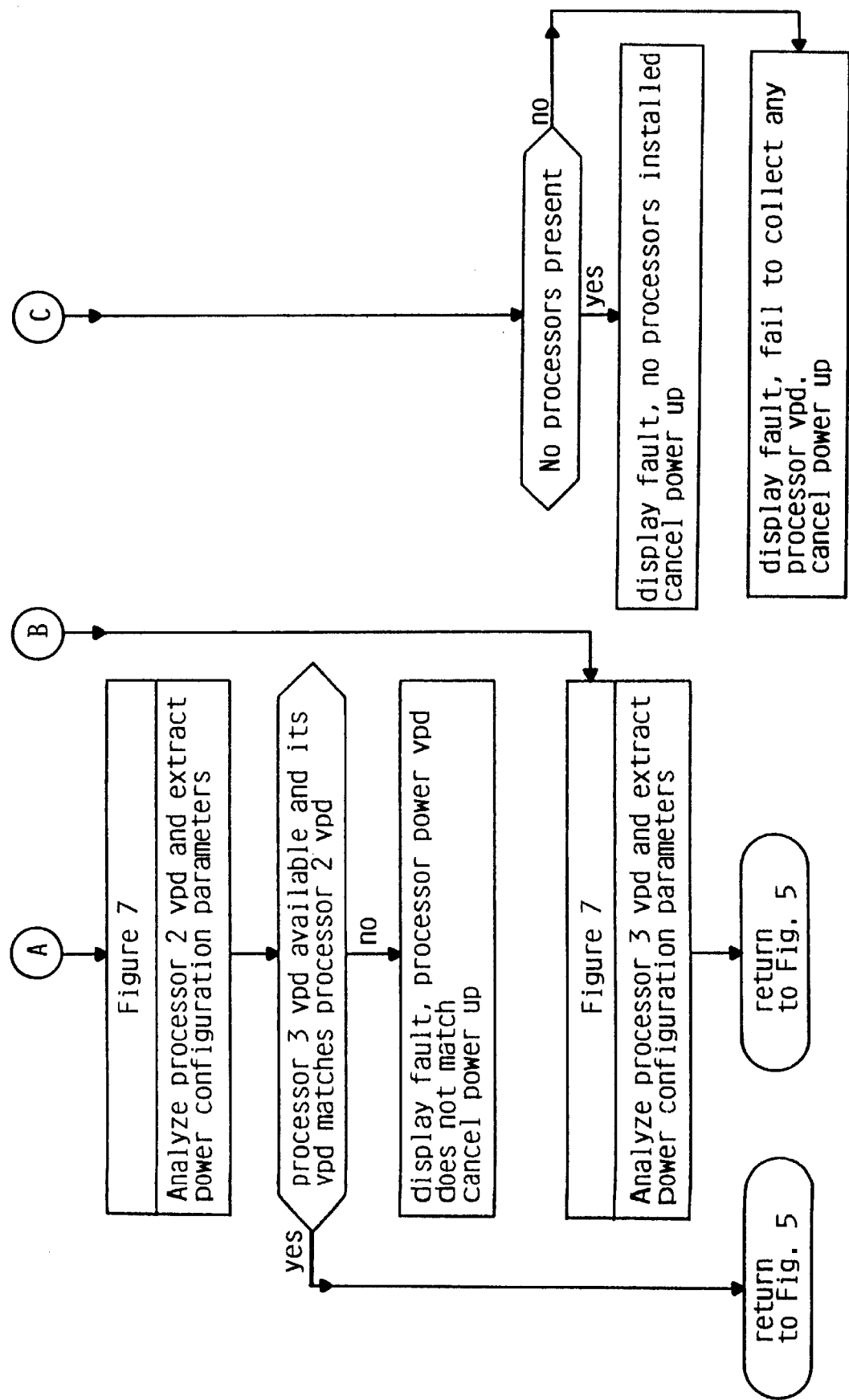

FIGS. 5 to 9 illustrate various exemplary processes to retrieve the Power VPD from the panel 106 and analyze the Power VPD to configure the power system. FIG. 6 illustrates a process of initiating the configuration checking according to an exemplary embodiment of the invention.

The process begins when a system power on request is initiated by the system operator. Power is applied to the VPD chips 120 and concentrator 116. Simultaneously, SPCN starts the power-up sequence and the panel 106 begins collection of VPD for the first 15 ports.

FIG. 5 illustrates the process of retrieving the power VPD table, analyzing the contents and configuring the power system. At a point early in the power-up sequence, SPCN issues a command to the panel 106 requesting the power VPD table. If the table cannot be successfully received, the power-up fails and a fault is displayed. If the command is successful, SPCN examines the value in the "max index" field in the first entry of the table. If this field contains zero, then no VPD was retrieved by the panel 106, the power-up is aborted and a fault is displayed. If the "max index" contains a non-zero value, the process continues to analyze the processor and backplane VPD, which are further illustrated in FIGS. 6 through 9. After analysis of the VPD, the "vpd level mismatch" flag is examined. This flag indicates that all the required VPD was not available and consequently, some parameters will be set to default values. A fault is displayed to indicate the problem. The configuration data determined from the VPD analysis in FIGS. 6 to 9 is applied to the power and cooling functions.

Figure 7A:
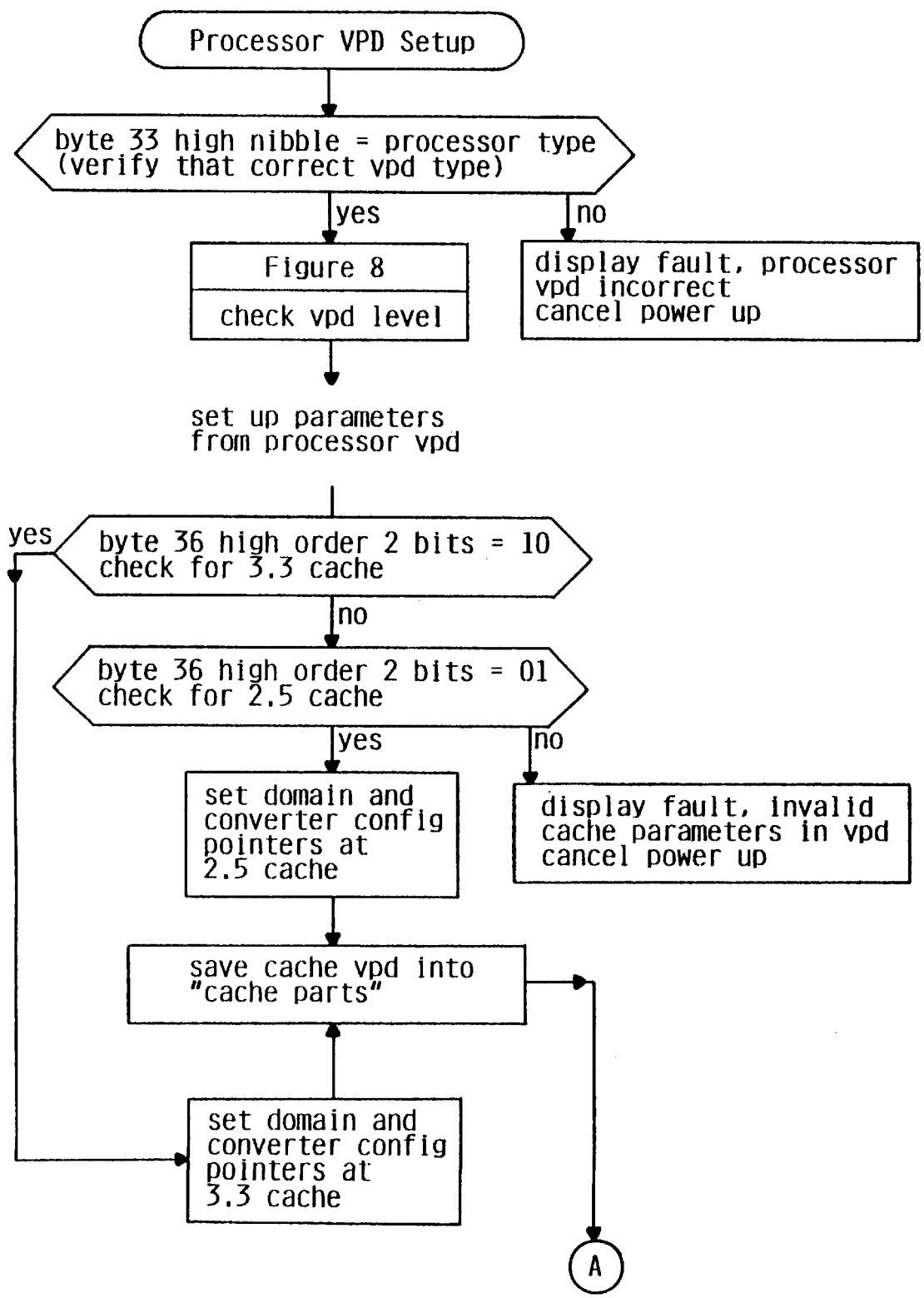
FIG. 7 illustrates a process of power VPD analysis according to an exemplary embodiment of the invention.
Figure 7B:
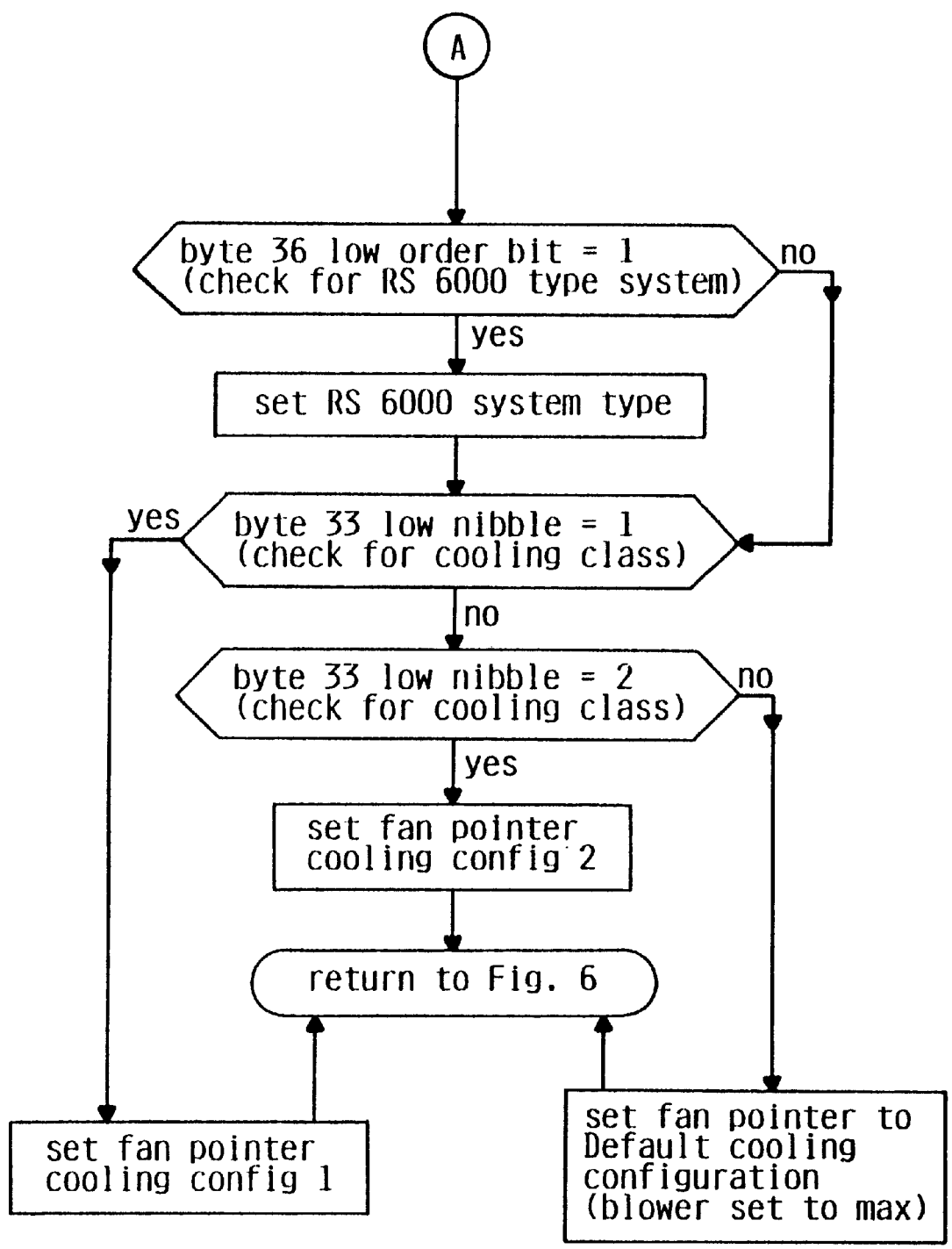

FIG. 6 illustrates the process of analyzing processor power VPD. If processor 1 is present and, if the power VPD was successfully retrieved as determined by the Header Flag byte in the first processor entry, the processor VPD is examined as illustrated by FIG. 7. After processor 1 VPD is analyzed, the power VPD for processors 2 and 3, if available, are matched against processor 1. If the power VPD from all processors does not mach, the power-up is failed and a fault is displayed.

If VPD for processor 1 is not available, then the processor 2 entry is examined. If the VPD for processor 2 is available, the processor VPD is examined as illustrated by FIG. 7. After processor 2 VPD is analyzed, the VPD for processor 3, if available, is matched against processor 2. If the power VPD from both processors does not match, the power-up is failed and a fault is displayed.

If VPD for processor 2 is not available, then the processor 3 entry is examined. If the VPD for processor 3 is available, the processor VPD is examined as illustrated by FIG. 7. If no processor VPD is available, then the power-up attempt is failed and a fault is displayed.

Figure 8A:
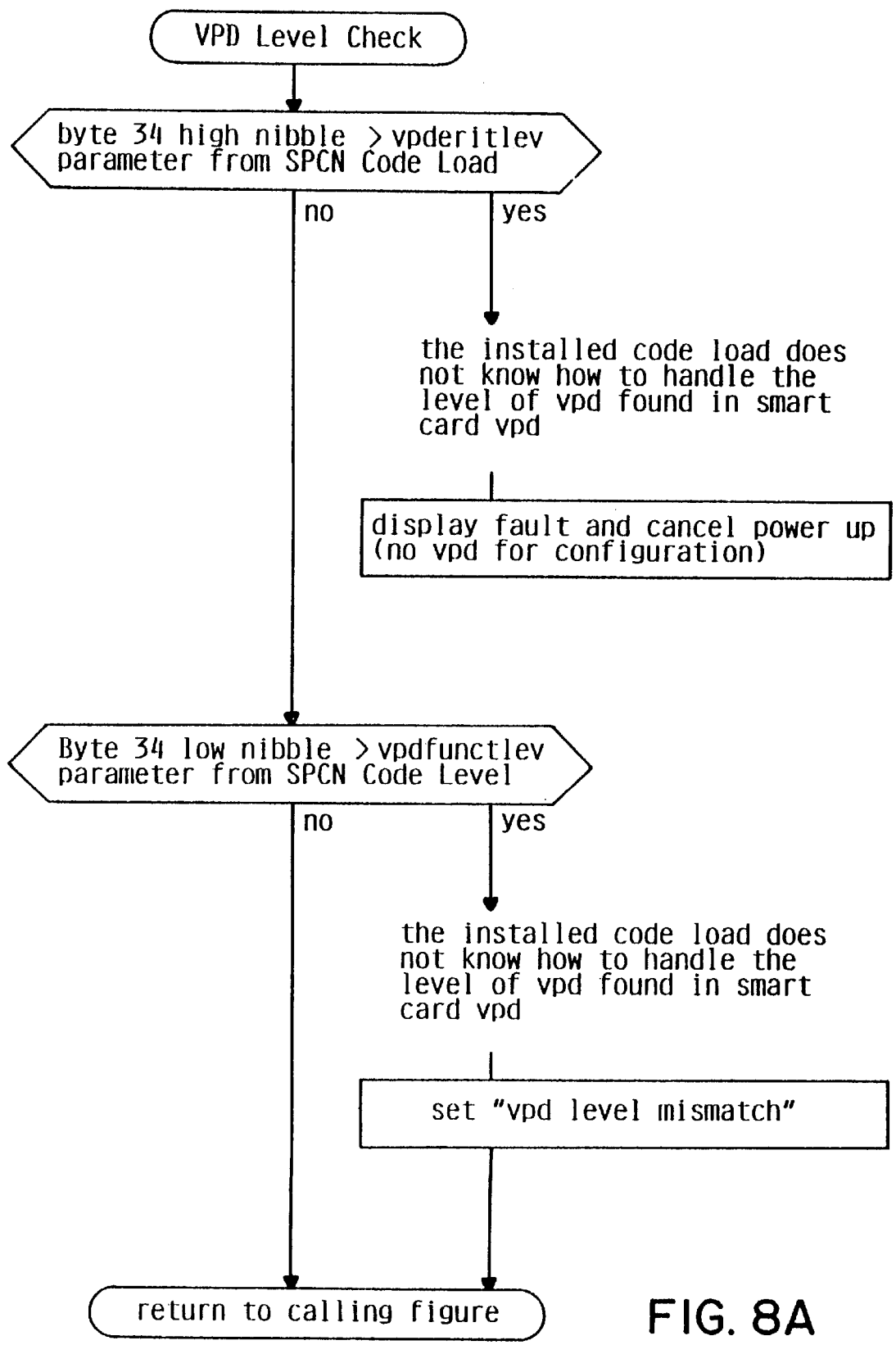
FIG. 8 illustrates a process of power VPD level checking according to an exemplary embodiment of the invention.

FIG. 7 illustrates the process of analyzing the processor power VPD: to extract configuration data. The high-order nibble of byte 33 is examined to verify that the VPD contains processor power VPD. The level of the VPD data is verified as illustrated in FIG. 8. Cache data in the processor specific field in byte 36 is examined to extract the cache voltage. The "system type" data in byte 36 is examined to set the RS/6000 configuration flag. Finally, the low nibble of byte 33 is examined to extract the cooling configuration. The cooling configuration will identify the number of blowers and their operational speedes.

Invalid cache parameters cause the power-up to fail to protect circuit components. Invalid cooling configuration causes all blowers to be set to their maximum speed, and the power-up sequence continues.

FIG. 8 illustrates the process of determining if SPCN code is at the correct level to be able to correctly interpret the power VPD data. The high nibble of byte 34 contains the critical VPD code level. The corresponding parameter in the SPCN code must be numerically equal or greater, or the power-up is failed and a fault is displayed. This indicates that the SPCN code may not be sufficiently current to interpret all the fields of the VPD data and consequently circuit damage conditions could exist.

The low order nibble of byte 34 contains the non-critical or functional level of the VPD data. The corresponding parameter in the SPCN code must be numerically equal or greater to correctly interpret the VPD data, but no circuit damage conditions exist. The power-up is not cancelled, but a fault is displayed because the power/cooling/concurrent maintenance system may be incorrectly configured.

Figure 9A:
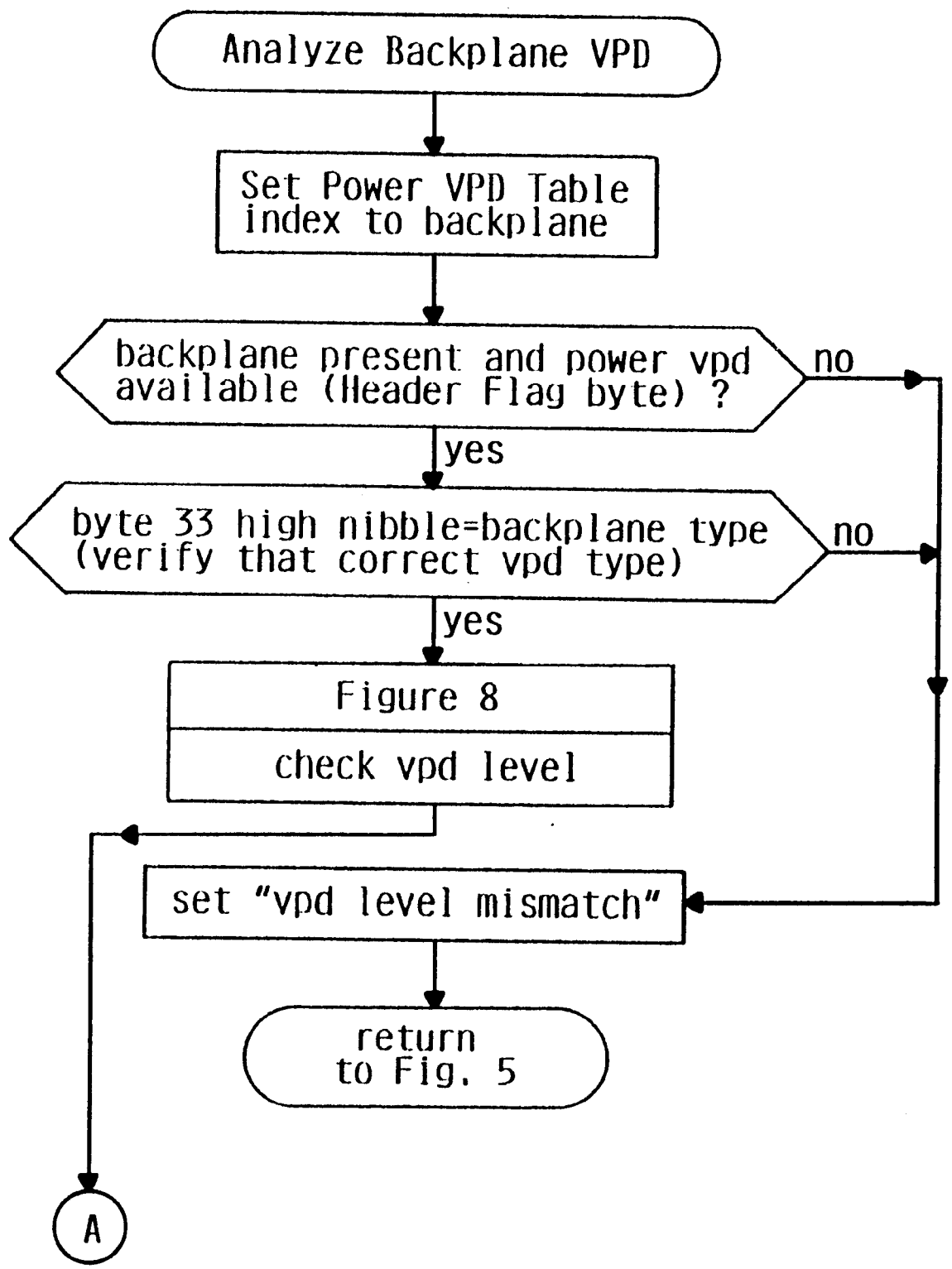
FIG. 9 illustrates a process of backplane power VPD analysis according to an exemplary embodiment of the invention.
Figure 9B:
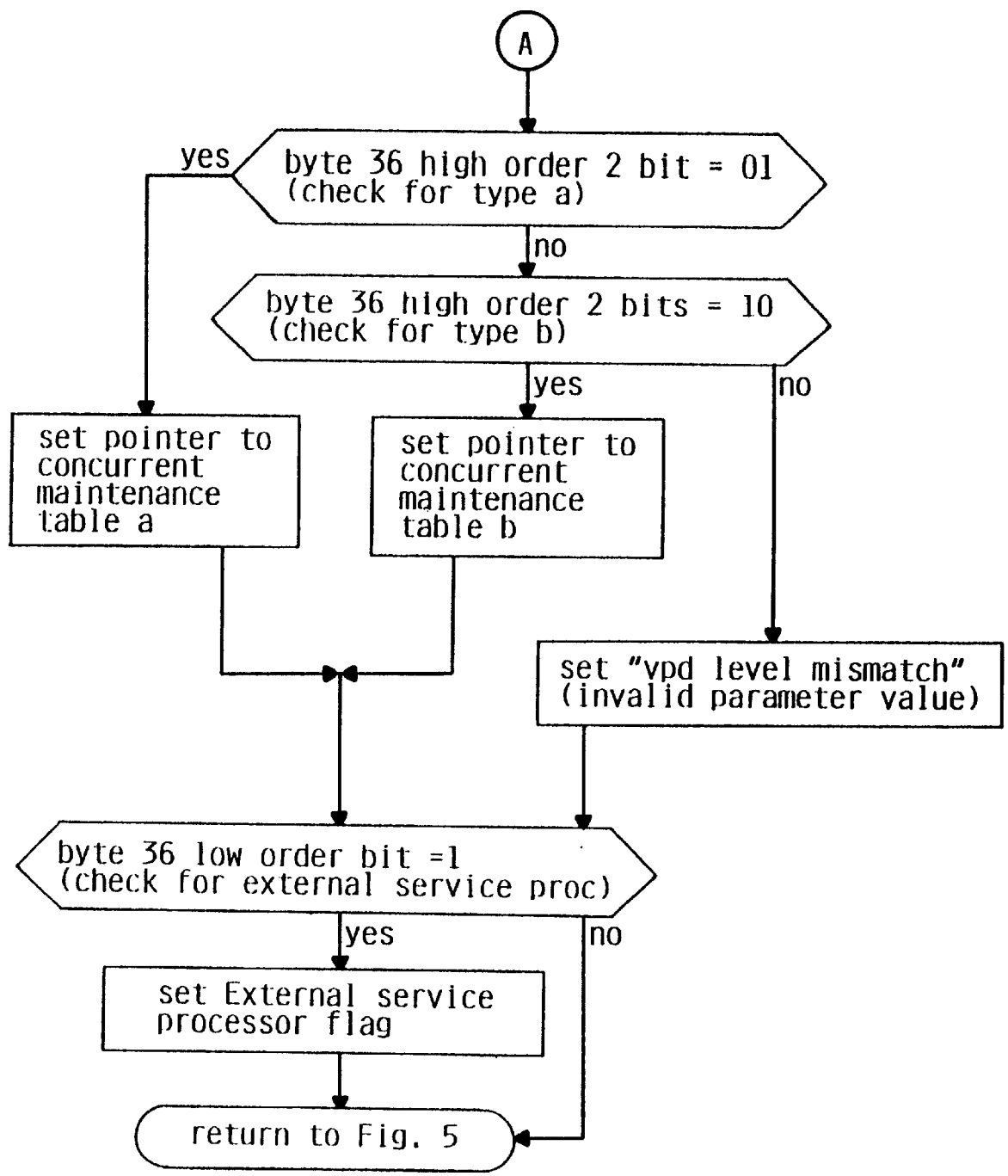

FIG. 9 illustrates the process of analyzing backplane power VPD. The Header, FRU type, and VPD level are examined in the same manner as for the processor, however, if failures are detected, the power-up sequence is not cancelled as no damage conditions exist. The backplane specific power VPD in byte 36 is examined to extract additional configuration parameters.

Figure 10A:
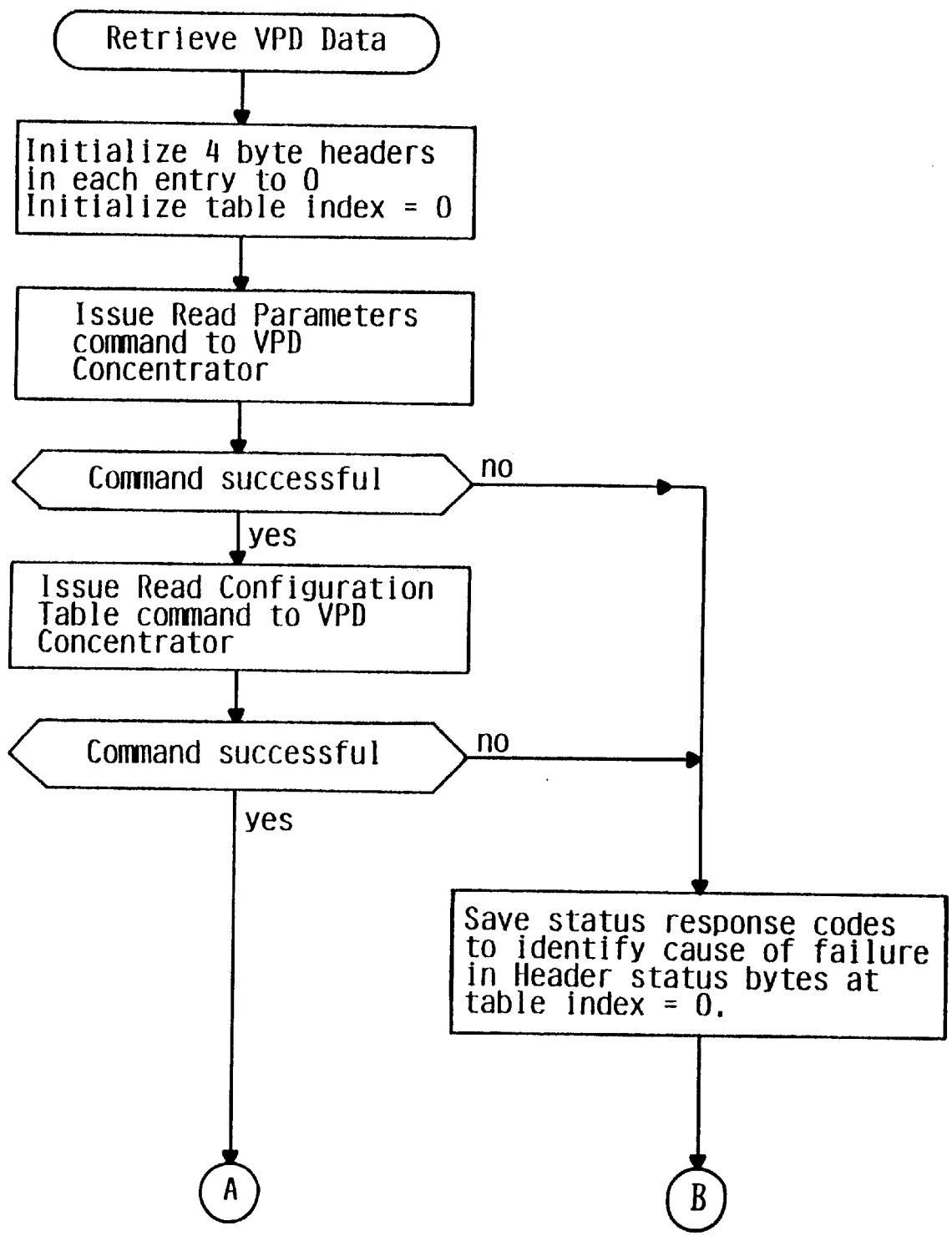
FIG. 10 illustrates a process of collecting VPD for a sub-set of system components according to an exemplary embodiment of the invention.
Figure 10B:
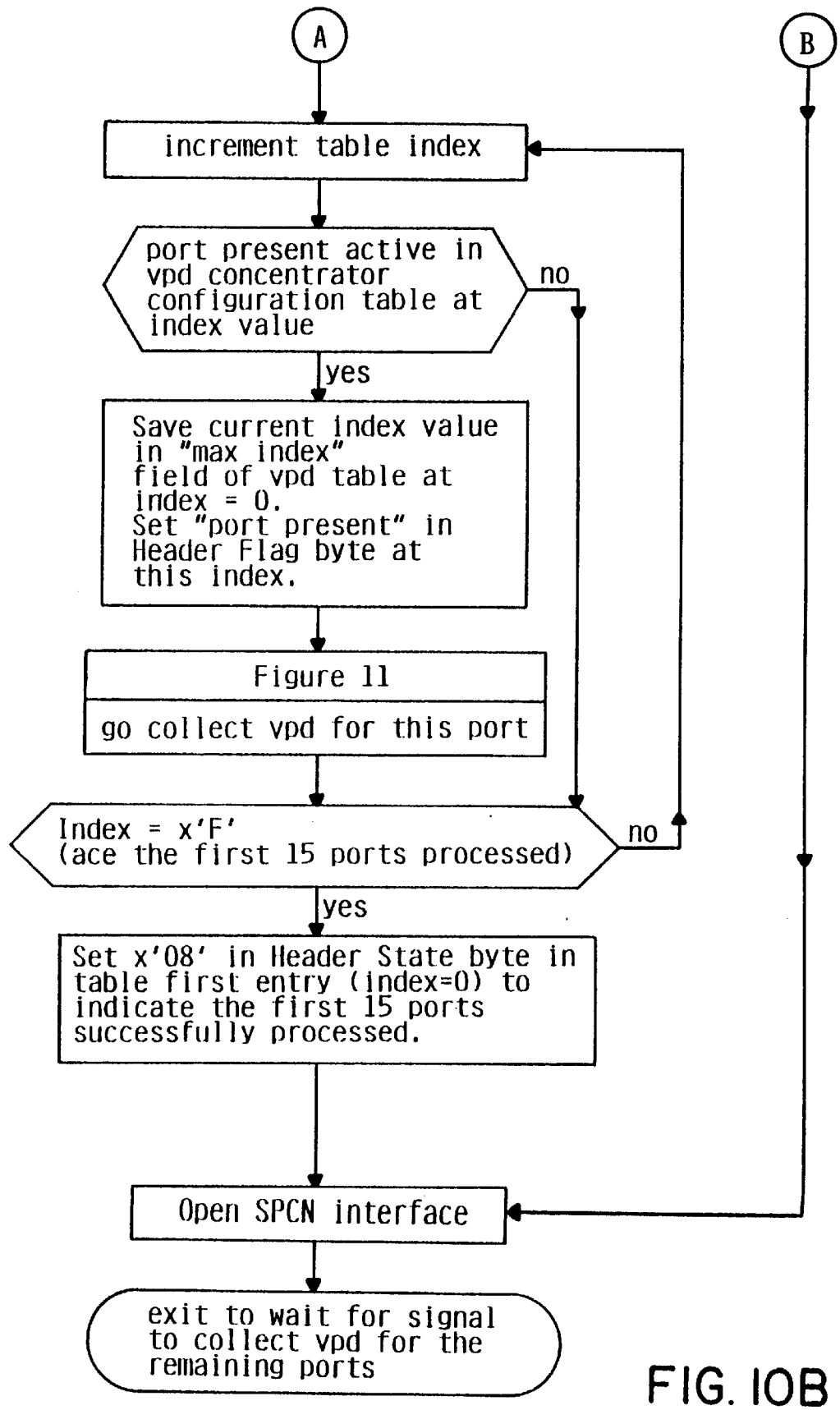
Figure 11:
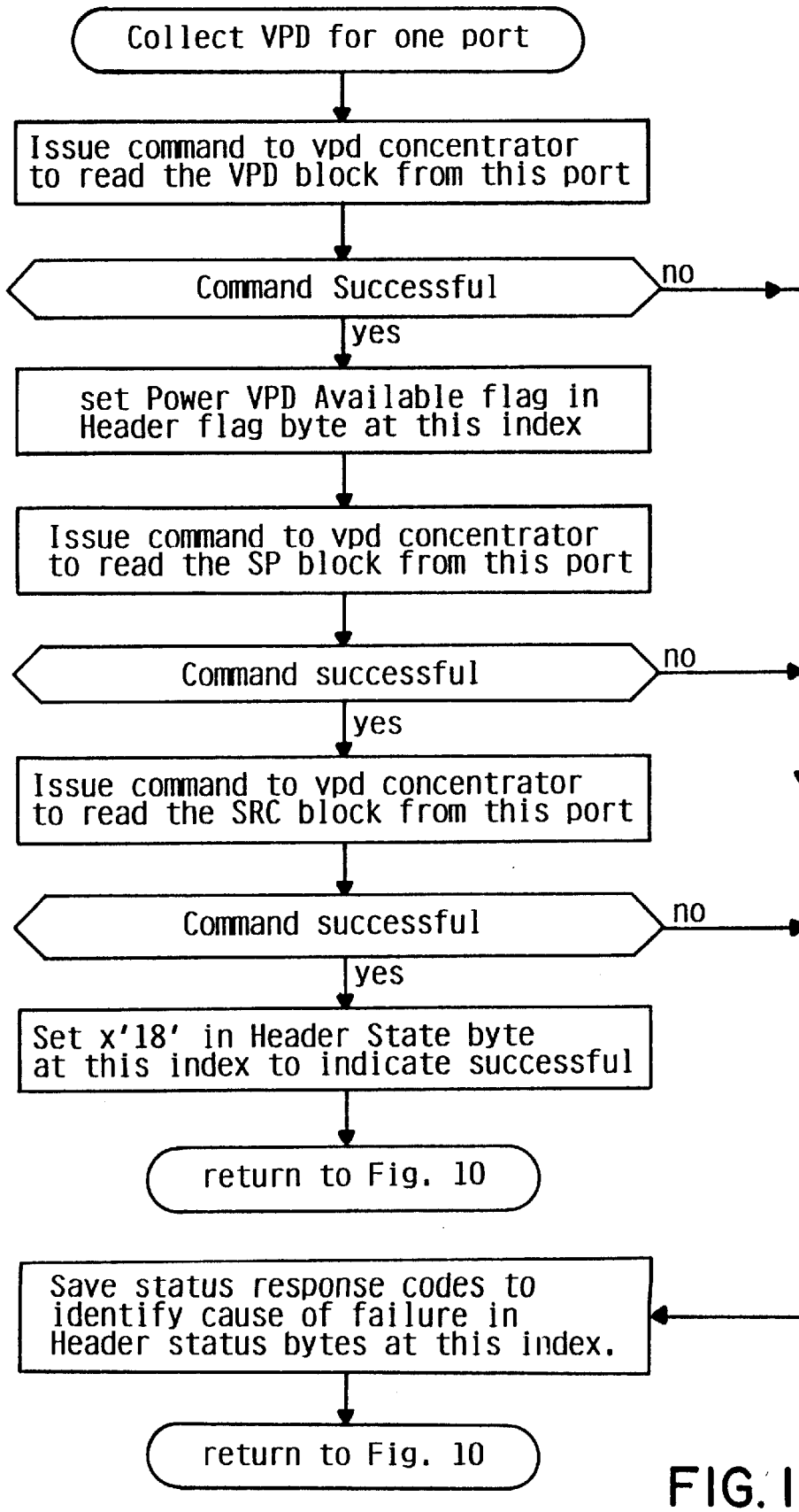
FIG. 11 illustrates a process of collecting VPD fro one port according to an exemplary embodiment of the invention.

FIGS. 10 and 11 illustrate the process used by the panel 106 to collect VPD from the first 15 ports. This is the amount required by the power controller (SPCN) to configure the power system and complete the power-up sequence. The panel 106 proceeds to collect the remainder of the VPD after SPCN signals that the power-up sequence has completed successfully add that collection is identical to the process illustrated in FIGS. 10 and 11. The specific commands required to communicate with the concentrator 116 and the smart card VPD chips 120 are not pertinent to this disclosure.

FIG. 10 illustrates the process of collection the data from the first 15 ports. The panel 106 issues a "read parameters" command to the concentrator 116 which confirms, for example, that the concentrator 116 is functioning correctly. This is followed by a "read configuration table" command to the concentrator 116 which returns a table that identifies which ports have a VPD chip 120 connected thereto. If these commands fail, then no VPD can be collected and the process is aborted. The "max index." field of the first table entry will contain 0 to indicate no VPD is available and the other fields will contain status to indicate the specific failure encountered.

For those ports which have a chip 120 connected, the VPD data is collected as illustrated in FIG. 11. Fur every port detected to be connected to a VPD chip, the "max index" field in the first table entry is updated and the "port present" bit is set in the Header Flag byte of the respective table entry. When all 15 ports have been processed, the Header state field of the first table entry is loaded with x'08' to indicate that this process was successfully completed. The SPCN interface is opened and the panel 106 waits for SPCN to request transfer of the power VPD subset.

FIG. 11 illustrates in more detail the steps to collect the VPD data for one port. The panel issues a command to the VPD concentrator 116 to collect the first piece of VPD data, the VPD block. If the command is successful, the "power vpd available" flag in the Header Flag byte is set, since the power VPD subset data is contained within this first piece. If the command is unsuccessful, then status codes and flags are set to indicate where in the path from the panel 106 to the VPD chip 120 the failure occurred.

If the first piece is successfully retrieved, a second command is issued to the concentrator 116 to retrieve the second piece, the SP block. If this command is successful, the third piece is retrieved. If all pieces are successfully retrieved, x'18' is stored in the Header State byte to indicate success.

It will be apparent to one skilled in the art that the manner of making and using the claimed invention has been adequately disclosed in the above-written description of the preferred embodiments taken together with the drawings.

It will be understood that the above described preferred embodiments of the present invention are susceptible to various modifications, changes, and adaptations, and the same are intended to be comprehended within the meaning and range of equivalents of the appended claims.

What is claimed is:

1. A system configuration apparatus for use with a computer system having a plurality of elements, comprising:

a plurality of information circuits, each information circuit being associated with a respective element of the computer system, the information circuits each storing data about the respective associated element of the computer system, the stored data being read by a control device of the computer system prior to applying power to the entire computer system in order to configure predetermined operating parameters of the computer system elements.

2. An apparatus according to claim 1, wherein the computer system includes a system control network through which the control device accesses the data stored in the plurality of information circuits.

3. An apparatus according to claim 2, wherein the computer system has a separate power source which powers up the information circuits separate from powering up the computer system.

4. An apparatus according to claim 3, wherein the information circuits are associated with at least one of the following types of elements of the computer system:

processors, memory devices; and backplanes.

5. An apparatus according to claim 4, wherein the computer system control device maintains a table of data accessed from the information circuits.

6. An apparatus according to claim 5, wherein the information circuits comprise smart card vital product data devices which store at least one of:

power configuration data; and cooling configuration data.

7. An apparatus according to claim 1, wherein the computer system has a separate power source which powers up the information circuits separate from powering up the computer system.

8. An apparatus according to claim 1, wherein the information circuits are associated with at least one of the following types of elements of the computer system:

processors;

memory devices; and backplanes.

9. An apparatus according to claim 1, wherein the computer system control device maintains a table of data accessed from the information circuits.

10. An apparatus according to claim 1, wherein the information circuits comprise smart card vital product data devices which store at least one of:

power configuration data; and cooling configuration data.

11. A method of configuring a computer system having a plurality of elements, the method comprising:

for each element of the computer system, storing data about the computer system element in a respective information circuit associated with the computer system element;

reading the data from the information circuits with a control device of the computer system prior to applying power to the entire computer system; and configuring operating parameters for the computer system elements based on the data read from the information circuits.

12. The method according to claim 11, wherein the storing data comprises at least one of:

storing power configuration data;

storing cooling system data.

13. The method according to claim 11, wherein the computer system includes a control network, and wherein the reading comprises reading the data from the information circuits through the control network.

14. The method according to claim 11, wherein the computer system has a separate power supply for the information circuits for powering the information circuits separately from powering up the computer system, and wherein the reading comprises powering up the information circuits before powering up the computer system.

15. The method according to claim 11, wherein the storing comprises storing data for at least one of the following types of computer system elements:

processors;

memory devices; and backplanes.

16. The method according to claim 11, further comprising:

storing the data read from the information circuits in a table in the control device.

17. The method according to claim 16, wherein the storing data further comprises at least one of:

storing power configuration data; and storing cooling system data.

18. The method according to claim 17, wherein the computer system includes a control network, and wherein the reading comprises reading the data from the information circuits through the control network.

19. The method according to claim 18, wherein the computer system has a separate power supply for the information circuits for powering the information circuits separately from powering up the computer system, and wherein the reading comprises powering up the information circuits before powering up the computer system.

20. The method according to claim 19, wherein the information circuits comprise smart card vital product data devices which store at least one of:

the power configuration data; and the cooling system data;

and wherein the reading further comprises verifying compatibility of the data read from the information circuits with operating system data.

* * * * *